US008243682B2

(12) United States Patent
Nylander et al.

(10) Patent No.: US 8,243,682 B2
(45) Date of Patent: Aug. 14, 2012

(54) METHOD AND ARRANGEMENT IN A TELECOMMUNICATION SYSTEM

(75) Inventors: Tomas Nylander, Värmdö (SE); Mats Buchmayer, Stockholm (SE); Jari Tapio Vikberg, Järna (SE); Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1118 days.

(21) Appl. No.: 12/126,614

(22) Filed: May 23, 2008

(65) Prior Publication Data
US 2009/0092097 A1 Apr. 9, 2009

Related U.S. Application Data

(60) Provisional application No. 60/977,202, filed on Oct. 3, 2007.

(51) Int. Cl.
*H04W 4/00* (2009.01)
(52) U.S. Cl. ......... 370/331; 455/437; 455/438; 455/444
(58) Field of Classification Search ........................ None
See application file for complete search history.

(56) References Cited

U.S. PATENT DOCUMENTS

| 7,613,444 | B2 * | 11/2009 | Lindqvist et al. ............. 455/403 |
| 7,768,983 | B2 * | 8/2010 | Nylander et al. ............. 370/338 |
| 8,027,681 | B2 * | 9/2011 | Burgess et al. ............... 455/436 |
| 8,121,089 | B2 * | 2/2012 | Bao et al. ....................... 370/331 |
| 2007/0097938 | A1 | 5/2007 | Nylander et al. |
| 2008/0194235 | A1 * | 8/2008 | Dalsgaard et al. ............ 455/411 |
| 2008/0305801 | A1 * | 12/2008 | Burgess et al. ............... 455/444 |
| 2008/0318576 | A1 * | 12/2008 | So et al. ......................... 455/436 |
| 2009/0047931 | A1 * | 2/2009 | Nanda et al. ................... 455/411 |
| 2009/0047960 | A1 * | 2/2009 | Gunnarsson et al. ......... 455/436 |
| 2009/0061873 | A1 * | 3/2009 | Bao et al. ....................... 455/436 |
| 2009/0070694 | A1 * | 3/2009 | Ore et al. ....................... 715/764 |
| 2009/0086691 | A1 * | 4/2009 | Balasubramanian ......... 370/338 |
| 2011/0269460 | A1 * | 11/2011 | Dalsgaard et al. .......... 455/435.1 |

FOREIGN PATENT DOCUMENTS
WO 2007/040449 A1 4/2007

OTHER PUBLICATIONS

3GPP TSG RAN2#59bis, Shanghai, China, Oct. 8-12, 2007, "Discovery of and mobility to CSG cells", R2-073919, 3 pages.
International Preliminary Report on Patentability dated Apr. 7, 2010 (6 pages).

* cited by examiner

*Primary Examiner* — Michael J Moore, Jr.
(74) *Attorney, Agent, or Firm* — Nixon & Vanderhye P.C.

(57) ABSTRACT

The described technology generally relates to method(s) and arrangement(s) for access control during relocation of a user equipment (UE) into a femto base station (FBS) and dynamic triggering of the relocation into the FBS. A white list is maintained in the UE. The white list includes information on a list of FBSs that the UE is allowed to relocate. The UE detects a target FBS and reports target FBS to a source macro base station (MBS). The source MBS makes a relocation request to a mobility controller. The mobility controller grants or denies the requests or allows the target FBS to make the decision. Upon grant, the UE is relocated to the target FBS. Otherwise, the white list is updated in the UE.

39 Claims, 27 Drawing Sheets

METHOD AND ARRANGEMENT IN A TELECOMMUNICATION SYSTEM

RELATED APPLICATION

This application claims the priority and benefit of U.S. provisional patent application 60/977,202 entitled "METHOD AND ARRANGEMENT IN A TELECOMMUNICATION SYSTEM" filed Oct. 3, 2007, which is incorporated herein by reference in its entirety.

TECHNICAL FIELD

The described technology generally relates to method(s) and arrangement(s) in a telecommunication system. In particular, the technology is related to method(s) and arrangement(s) for access control during a relocation of a user equipment (UE) from a macro base station (MBS) to a femto base station (FBS) and dynamic triggering of the relocation.

BACKGROUND

Specification is ongoing in 3GPP (Third Generation Partnership Project) for E-UTRAN (Evolved Universal Terrestrial Radio Access Network) that is one of the next generation of radio access networks. Another name used for E-UTRAN is the Long Term Evolution (LTE) Radio Access Network (RAN). A base station in this concept is referred to as an eNB (E-UTRAN NodeB). Base stations, such as eNBs, normally provide radio access network services to relatively many user equipments.

The studies also include the possibility to have base station functionalities for home or small area coverage for a limited number of users. This type base station is referred to as a HNB (HomeNodeB) or FBS (femto base station). The FBS provides normal coverage for the end users within the small area and are connected to the mobile core network using readily available internet connectivity. The coverage provided by the FBS is called a femto cell, also known as a Closed Subscriber Group (CSG) cell in 3GPP.

One motivation behind the femto cell movement is to provide cheaper call or transaction rates/charges when connected via the FBS (femto cell) compared to when connected via the eNB (macro cell). Another motivation is to provide improved indoor coverage while off-loading traffic from relatively expensive macro radio access networks to relatively inexpensive public Internet. The FBS would in most instances use the end users already existing broadband connection (e.g. xDSL, Cable) to achieve connectivity to the operators mobile core network and possibly to other eNB/FBS.

Unlike the current radio access networks in which operators integrate relatively few (hundreds) high-capacity radio base stations connected over relatively secure private networks to Radio Network Controllers (RNCs), access via femto cells is likely to require the operators to integrate relatively many (hundreds of thousands or more) low-capacity FBSs connected over relatively insecure/untrusted public Internet. Complicating the matter is that the FBSs can be moved, added or changed at any time. The femto cell idea promises many benefits, but also presents many challenges including challenges to access control.

SUMMARY

The described technology generally relates to method(s) and arrangement(s) for access control during relocation of a user equipment into a femto base station and dynamic triggering of the relocation into the femto base station. Femto base stations allow users to leverage already existing broadband connections to off load demands for service from base stations.

In a non-limiting aspect, a white list is maintained in the user equipment. The white list includes information on one or more femto base stations that are available to provide connectivity to the user equipment. Each femto base station can be identified by a short identity and a long identity. The long identity uniquely identifies each base station while the short identity non-uniquely identifies the base stations. As the names imply, the length of the short identity is shorter than the long identity. Advantages of the short identity is that less information needs to be broadcasted frequently by the femto base station and the user equipment can obtain the identity faster and not need to spend battery and processing power.

The white list can include other information regarding the femto base stations such as a macro cell (macro base station) that over lays the femto cell corresponding to the femto base station, a timing advance of the macro base station, location of the femto base station, a list of time the femto base station is normally accessed. etc.

A non-limiting method to perform a relocation of a user equipment from a source macro base station to a target femto base station comprises the following activities. Based on the white list, the user equipment detects the target femto base station. As an example, the target femto base station is arranged to periodically transmit its short and long identities and the user equipment is arranged to read the transmitted identities. The user equipment reports the detected target femto base station to the source macro base station.

A decision can be made to relocate, i.e., perform handover of, the user equipment from the source macro base station to the target femto base station. If so, the source macro base station transmits a command to relocate to the user equipment. Upon receipt of the relocation command, the user equipment performs the relocation operations.

A decision can also be made that that relocation is not possible. For example, it may be that the user equipment is not authorized to access the target femto base station. In this instance, the source macro base station issues a command to update the white list to the user equipment. Upon receipt of the white list update command, the user equipment updates its white list. In one example, the target femto base station entry in the white list is removed as being available to provide connectivity to the user equipment.

A non-limiting example method performed by the user equipment to detect and report the target femto base station include the following activities. The user equipment determines, based on the white list, that there are possible femto base stations for the relocation of the user equipment. For example, the user equipment may detect a presence of a base station whose short identity matches one or more short identities in the white list. As another example, the source macro base station may be listed in the white list as having a macro cell that over lays one or more femto cell areas corresponding to one or more femto base stations. As a further example, a timing advance of the source macro base station matches one or more timing advances in the white list. As yet another example, the current location of the user equipment (based on GPS or some other location determination mechanisms) may be within a predetermined distance from one or more femto base stations in the white list. Yet further, the current time may match, within a predetermined tolerance, of normal access times of one or more femto base stations in the white list.

After determining that there are possible femto base stations, the user equipment identifies a femto base station as the target femto base station. In this activity, the user equipment retrieves (reads) the short identity of a detected femto base station. If the short identity is in the white list, i.e., if it is determined that relocation to the detected femto base station is possible based on the short identity, then the user equipment retrieves (reads) the long identity. If the long identity is in the white list, i.e., if it is determined that relocation to the detected femto base station is possible based on the long identity, then the user equipment retrieves reports the long identity of the detected femto base station to the source macro base station.

A non-limiting example method to retrieve the short identity and to determine whether the relocation is possible based on the short identity includes the following activities. The user equipment makes a request to the source macro base station for a short gap. The short gap is a time slot in which the source macro base station will not transmit data to the user equipment. This allows the user equipment to read the short identity transmitted by the detected femto base station. When the short gap is granted by the source macro base station, the user equipment proceeds to read the short identity transmitted by the femto base station and compares the read short identity against the white list.

If the read short identity is in the white list, then it is possible that the femto base station can provide connectivity. However, since the short identity is not necessarily unique, a similar procedure is followed to retrieve the long identity which is unique. That is, the user equipment makes a request for a long gap and upon being granted the long gap, the user equipment reads the long identity and compares the read long gap to the long identities in the white list. The long gap is also a time slot in which the source macro base station will not transmit data to the user equipment. The duration of the long gap is greater than that of the short gap.

However, if the target femto base station and the source macro base station are on a same carrier, then only the long gap need to be requested. Alternatively, if the user equipment is equipment with a dual receiver, then the short and long gaps need not be requested since the user equipment is able to read the identities transmitted by the femto base station simultaneously with receiving data from the source macro base station.

Note that the source macro base station need not be preconfigured with knowledge of the target femto base stations.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1-2 illustrates an embodiment of a wireless network with a macro base station and a femto base station connected to a same mobility controller;

FIG. 2-1 is an example chart of signaling flow between nodes of the wireless network for relocation where source and target mobility controllers are involved and the decision to allow access to the target femto base station is made by the target mobility controller;

FIG. 2-2 is an example chart of signaling flow between nodes of the wireless network for relocation when there is one mobility controller involved and the mobility controller decides whether access to the target femto base station is allowed;

FIG. 2-3 is an example chart of signaling flow between nodes of the wireless network for relocation where source and target mobility controllers are involved and the decision to allow access to the target femto base station is made by the femto base station itself;

FIG. 2-4 is an example chart of signaling flow between nodes of the wireless network for relocation when there is one mobility controller involved and the target femto base station decides whether access is allowed;

FIG. 3-1 is an example chart of signaling flow between nodes of the wireless network not allowing relocation where source and target mobility controllers are involved and the decision is made by the target mobility controller;

FIG. 3-2 is an example chart of signaling flow between nodes of the wireless network not allowing relocation when there is one mobility controller involved and the decision is made by the target mobility controller;

FIG. 3-3 is an example chart of signaling flow between nodes of the wireless network not allowing relocation where source and target mobility controllers are involved and the decision is made by the femto base station;

FIG. 3-4 is an example chart of signaling flow between nodes of the wireless network not allowing relocation when there is one mobility controller involved and the decision is made by the femto base station;

FIG. 4 is an example chart of signaling flow between the user equipment and the source macro base station to read the short and long identities of the femto base station;

FIG. 8-1 is a flow chart of an example method to retrieve a short identity of a femto base station and to determine the detected femto base station is a possible target femto base station based on the short identity;

FIG. 8-2 is a flow chart of an example method to retrieve a long identity of a femto base station and to determine the detected femto base station is a possible target femto base station based on the long identity;

FIG. 9-1 is a flow chart of an example method to retrieve a long identity of a femto base station and to determine the detected femto base station is a possible target femto base station based on the long identity when the source macro base station and the femto base station is on a same carrier;

FIG. 9-2 is a flow chart of an example method to retrieve a long identity of a femto base station and to determine the detected femto base station is a possible target femto base station based on the long identity when the user equipment is a dual-receiver user equipment;

FIG. 16-1 is a flow chart of an example method to perform access control for the user equipment from the perspective of the mobility controller;

FIG. 16-2 is a flow chart of another example method to perform access control for the user equipment from the perspective of the mobility controller.

DETAILED DESCRIPTION

Figure 1:
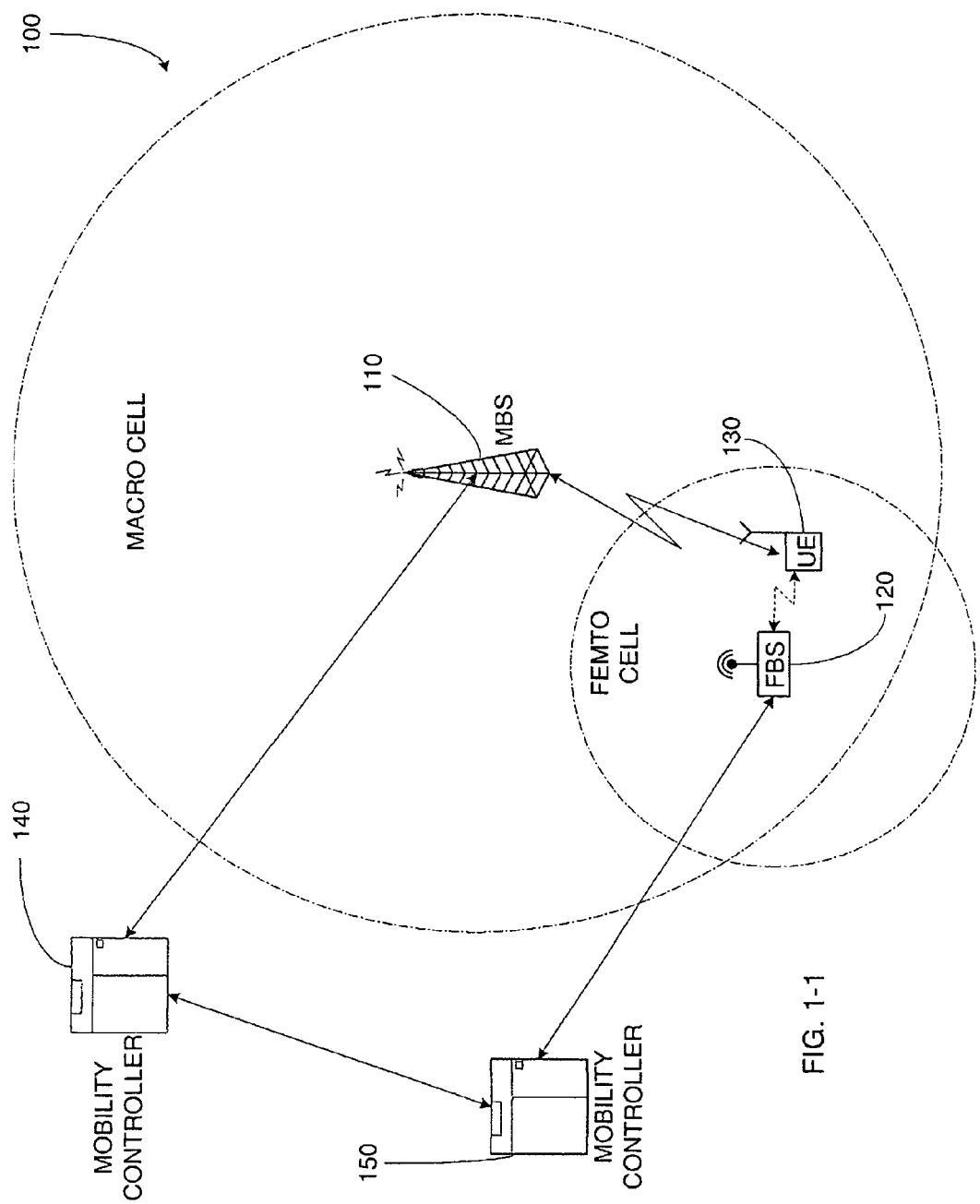
FIG. 1-1 illustrates an embodiment of a wireless network with a macro base station and a femto base station connected to separate mobility controllers.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

One of many aspects of the described technology involves relocating, e.g., performing a handover, of a user equipment (UE) from a macro base station (MBS) such as an eNB to a femto base station (FBS) such as a HNB. In general, MBSs work very well in outdoor settings. However, the MBSs do not work as effectively in providing services in an indoor setting such as a home or an office. The presence of physical barriers such as walls hinders the effectiveness of the MBSs indoors. FBSs on the other hand can work very well in indoor settings. Thus, relocating the UE from the MBS to the FBS would benefit the UE when the UE moves to an indoor setting.

FBSs can provide wireless services similar to the MBSs, but the services are provided on a correspondingly smaller scale. The FBSs access the network through a publicly-switched telephone network, which can be made available through conventional broadband access such as DSL and cable. When the UE communicates with a FBS, the UE is offloaded from the MBS that would normally provide the service. In effect, the FBS can be viewed as a dedicated, personal base station to the UE. FBSs are relatively inexpensive ways to enhance the capacity of the underlying network which is another advantage of relocating the UE from the MBS to the FBS.

A further advantage of FBSs is their inherent flexibility. FBSs can be moved from one location to another without much difficulty. Also, more FBSs can be added to a macro cell area without incurring too much additional expense. The FBS may be owned by an end user or the end user may rent the FBS from a network operator or service provider. But regardless of who owns the FBS device itself, it is preferred the end user to be in control of specifying who can access the FBS and the broadband connection. That is, it would be desirable for the end user to have access control over which UE(s) can access the FBS.

In a non-limiting aspect of the described technology, a handover or relocation is enabled to relocate the UE, which is currently served by a MBS (source MBS) to be served by a FBS (target FBS). One of many complicating factors that stand in the way is the definition of the femto cells in the neighboring cell lists in the macro network. The number of femto cells is estimated to be in the order of tens of thousands or more. However, the neighboring cell lists in networks such as WCDMA/UTRAN can currently contain only a limited number—32—of cells for each of the different types of cells: Intra-frequency, Inter-frequency and GSM—for 96 in total. Further, it is not feasible to configure this information statically as the end users are free to relocate the FBS to a new location, perhaps to another macro cell. It is anticipated that the LTE networks will have similar limits in the number of cell in the Neighboring Cell lists. Thus, it is preferred that the relocation be performed without any pre-configuration of target FBSs in the source MBS.

FIG. 1-1 illustrates a non-limiting embodiment of a wireless network 100 in which a relocation of a UE 130 from a source MBS 110 to a target FBS 120 occurs. For clarity and brevity, only a single MBS 110 and a single FBS 120 are illustrated. However, multiple MBSs and FBSs are contemplated. The source MBS 110 is operatively connected to a source mobility controller 140 and the target FBS 120 is operatively connected to a target mobility controller 150. Further, the source and target mobility controllers 140 and 150 are connected to each other. Examples of mobility controllers include Mobility Management Entity (MME) in the LTE.

Figures 1, 2:
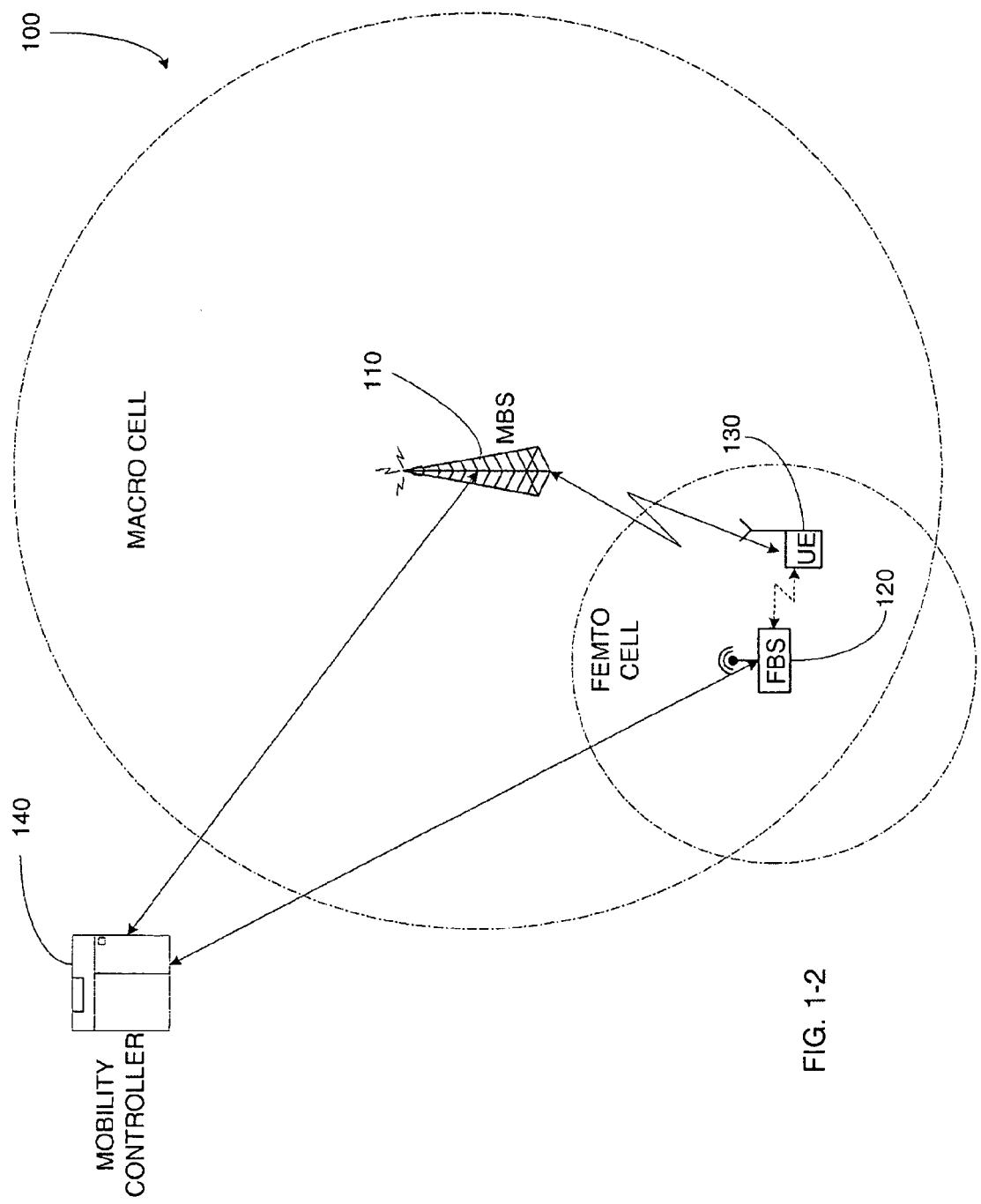

In general, when it is decided that a relocation is required, the source MBS 110 signals the source mobility controller 140, which in turn signals the target mobility controller 150. The mobility controller 150 may decide to grant the relocation request itself or may further signal the target FBS 120 to make the decision. After the decision is made, response signals flow to the target mobility controller 150, the source mobility controller 140 and to the source MBS 110. Note that the source MBS 110 and the target FBS 120 can be connected to the same mobility controller 140 as illustrated in FIG. 1-2. In this instance, the number of signals are correspondingly reduced. The signaling details will be explained further below with reference to FIGS. 2-1 through 3-4.

As seen in FIGS. 1-1 and 1-2, the source MBS 110 provides wireless services to UEs in a corresponding macro cell and the target FBS 120 provides wireless services to UEs in a corresponding femto cell. The macro cell is relatively large and can overlay femto cells of multiple femto base stations.

When it is determined that a relocation would be beneficial, i.e., decided that a relocation is required, information on the identity of the UE 130 and the identity of the target FBS 120 are included in the signaling for the relocation preparation phase. The identity of the UE 130 can be its IMSI (International Mobile Subscriber Identification) which uniquely identifies the UE 130. As will be detailed further below, the identity of the target FBS 120 maybe its "long" identity which also uniquely identifies target FBS 120.

The access control, i.e., make decision to allow or deny access, to the target FBS 120 may be performed by either by the target FBS 120 or by the mobility controller (target mobility controller 150 in FIG. 1-1 or mobility controller 140 in FIG. 1-2) connected to the target FBS 120. If the relocation is denied, then the "white list" of the UE 130 is updated (again explained further below).

FIG. 2-1 is an example chart of signaling flow between nodes of the wireless network for relocation where source and target mobility controllers 140 and 150 are involved and the decision to allow access to the target FBS 120 is made by the target mobility controller 150. The sequence can be generally described as follows.

(1) The UE 130 enters an active state in a macro cell controlled by the source MSB 120.
(2) The UE 130 detects the target FBS 120 and reports the target FBS 120 to the source MBS 130.
(3) The source MBS 130 sends the Relocation Required message to the source mobility controller 140. The message includes the target FBS 120 identification. For example in LTE, the TAI+CI can be reported.
(4) The source mobility controller 140 identifies the target mobility controller 150 controlling the target FBS 120 and forwards the Relocation Request to the target mobility controller 150. The message includes, among other information, the UE 130 identification (i.e., the IMSI) and the target FBS identifier (i.e., the long identity).
(5) The target mobility controller 150 performs access control for active mode users and decides to allow the relocation request.
(6) The target mobility controller 150 notifies the target FBS 120 of the relocation request and the grant of the request.
(7) The target FBS 120 acknowledges the request and grant.
(8) The target mobility controller 150 sends a relocation response to the source mobility controller 140.
(9) The source mobility controller 140 forwards the relocation response to the source MBS 120.
(10) The source MBS 120 sends a relocation command signal to the UE 130.
(11) The UE 130 performs the relocation to the target FBS 120.

Note that for (5), the target mobility controller 150 can perform the access control using similar steps as for idle mode Access Control. The target mobility controller 150 can be configured with a list of UE identifications (IMSI's) allowed to access a specific FBS or the target mobility controller 150 can have access to a central database with this information.

FIG. 2-2 is an example chart of signaling flow between nodes of the wireless network for relocation when there is one mobility controller 140 involved and the mobility controller 140 decides whether access to the target FBS 120 is allowed. The signaling flow is similar to that of FIG. 2-1 except that the signals between the mobility controllers—signals (4) and (8)—are now unnecessary.

Figures 1, 2:
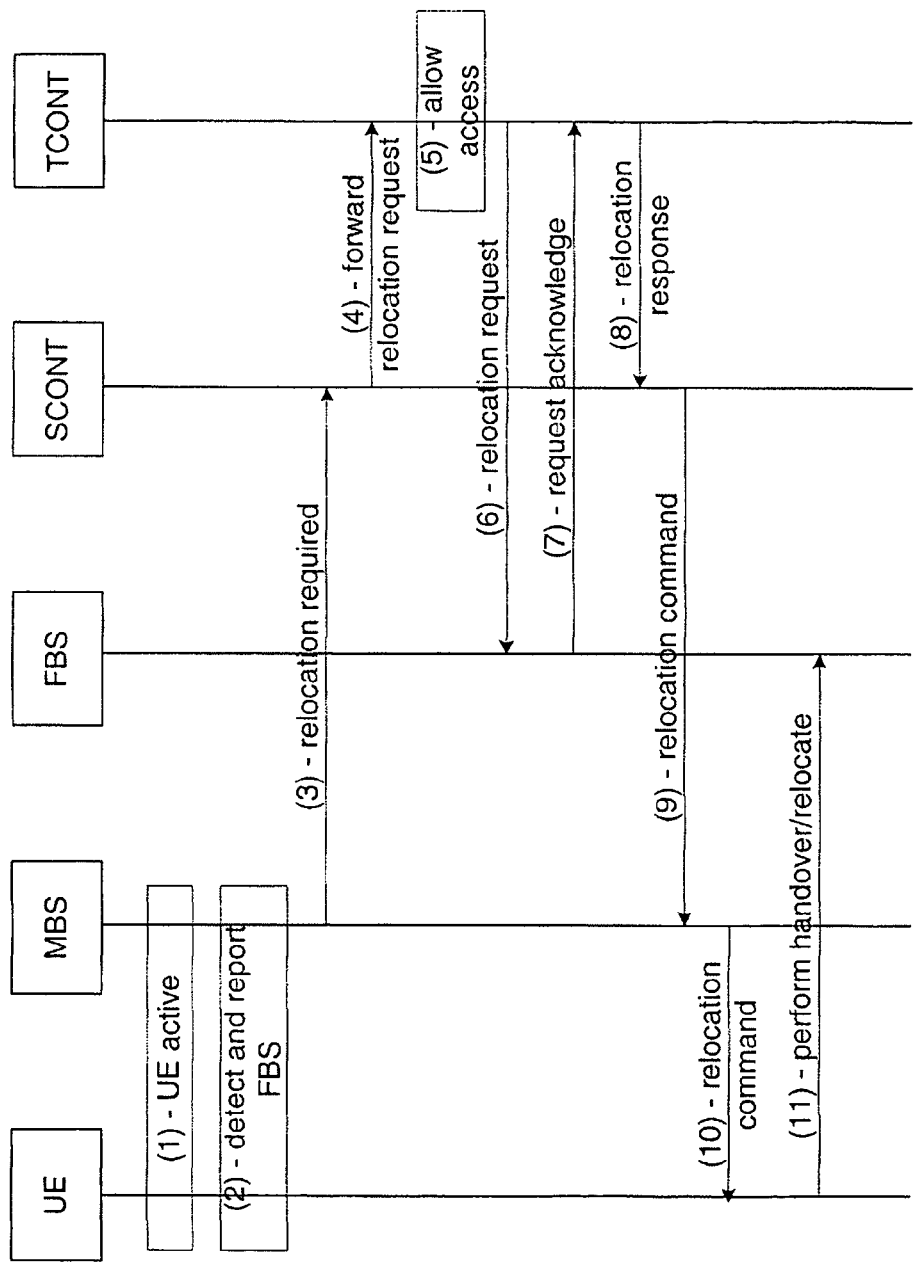
Figure 2:
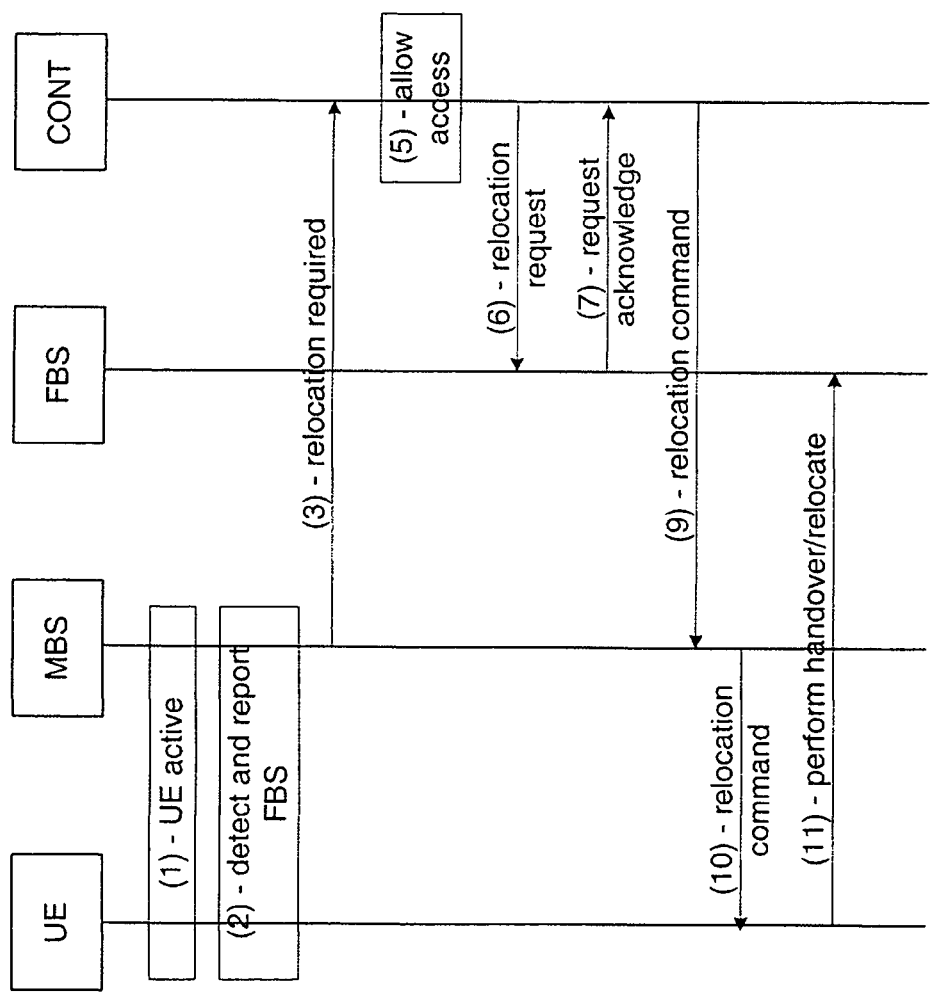
Figures 2, 3:
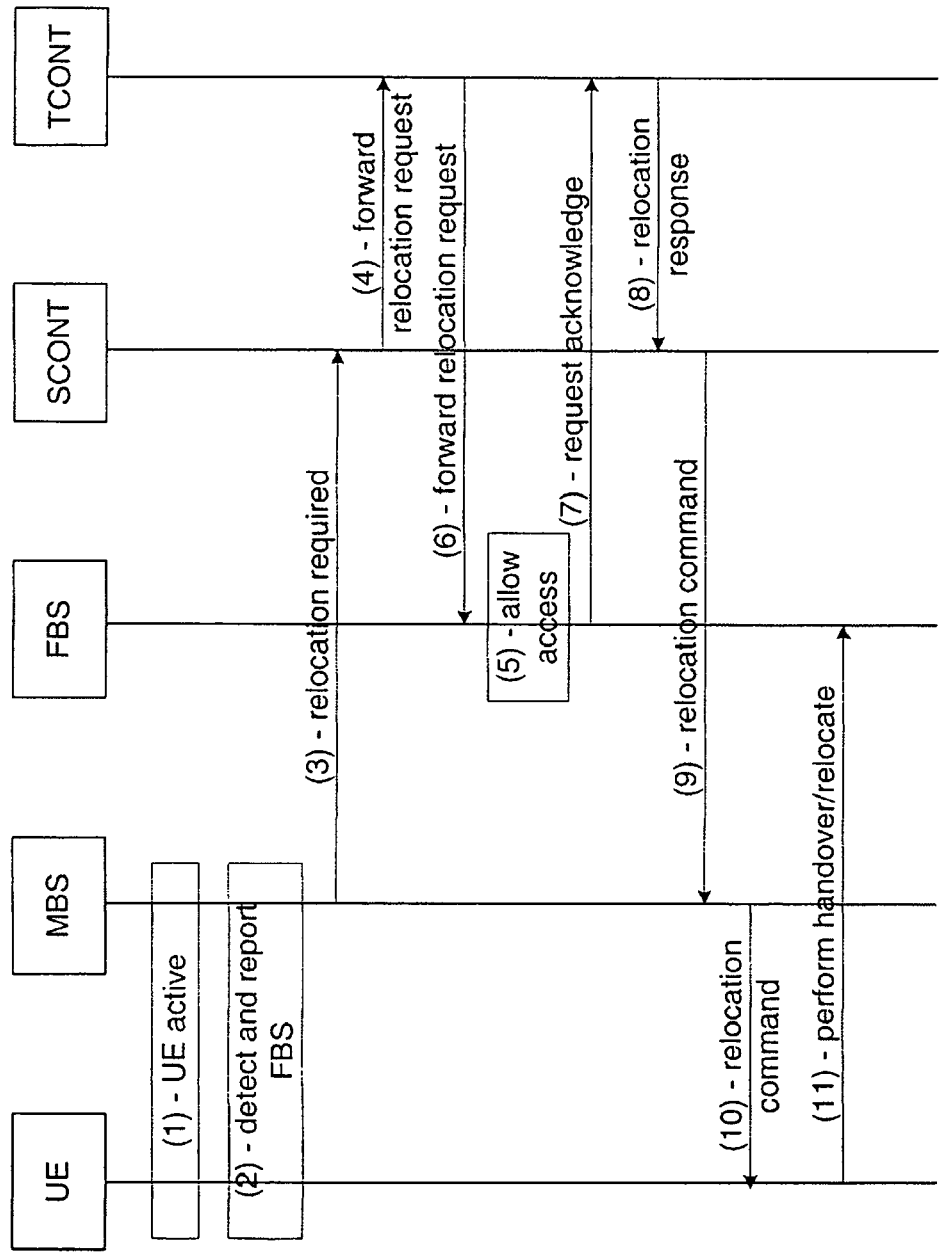

FIG. 2-3 is an example chart of signaling flow between nodes of the wireless network for relocation where source and target mobility controllers 140 and 150 are involved and the decision to allow access to the target FBS 120 is made by target FBS 120. The signaling flow is similar to that of FIG. 2-1 except that the access control decision (5) is performed in the target FBS 120. In this instance, the target FBS 120 can be configured with a list of UE identifications (IMSI's) allowed to access the FBS 120 or the target FBS 120 can have access to the central database.

Figures 2, 3, 4:
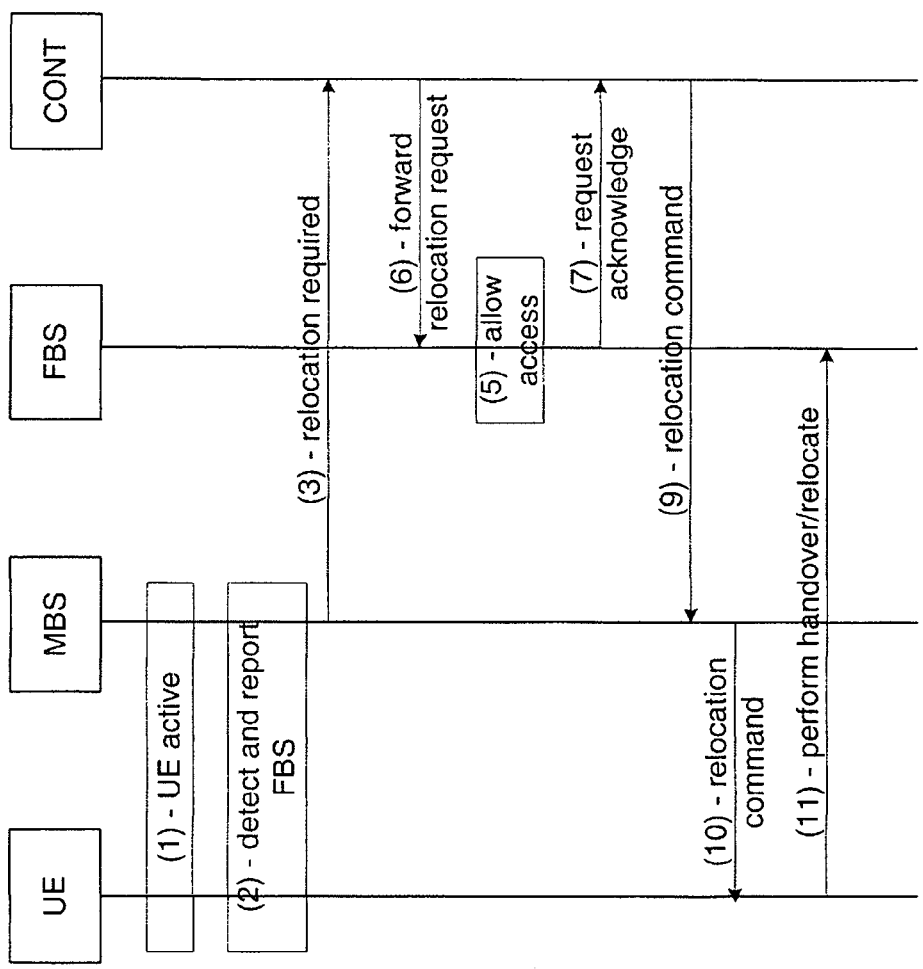
Figures 1, 3:
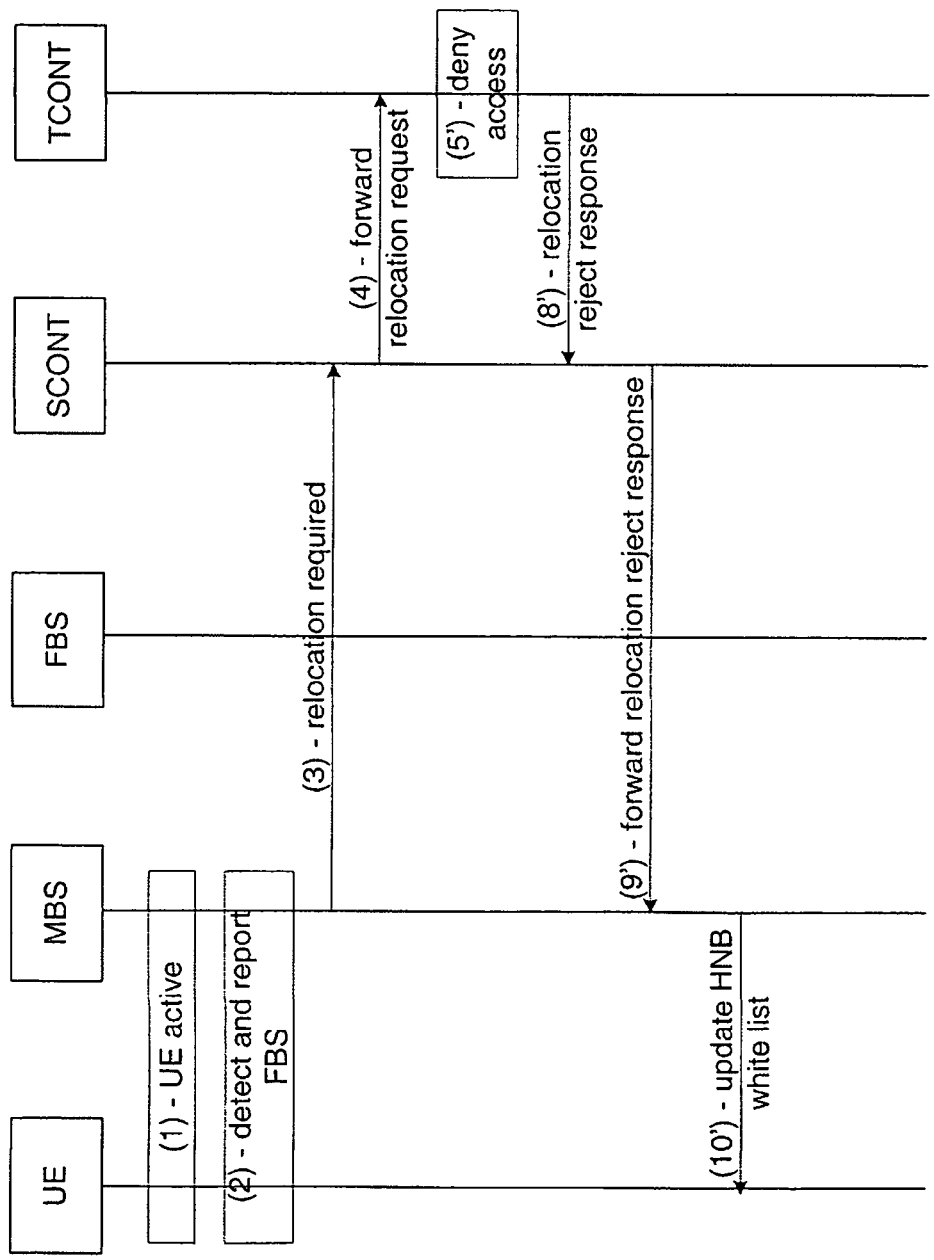
Figures 2, 3:
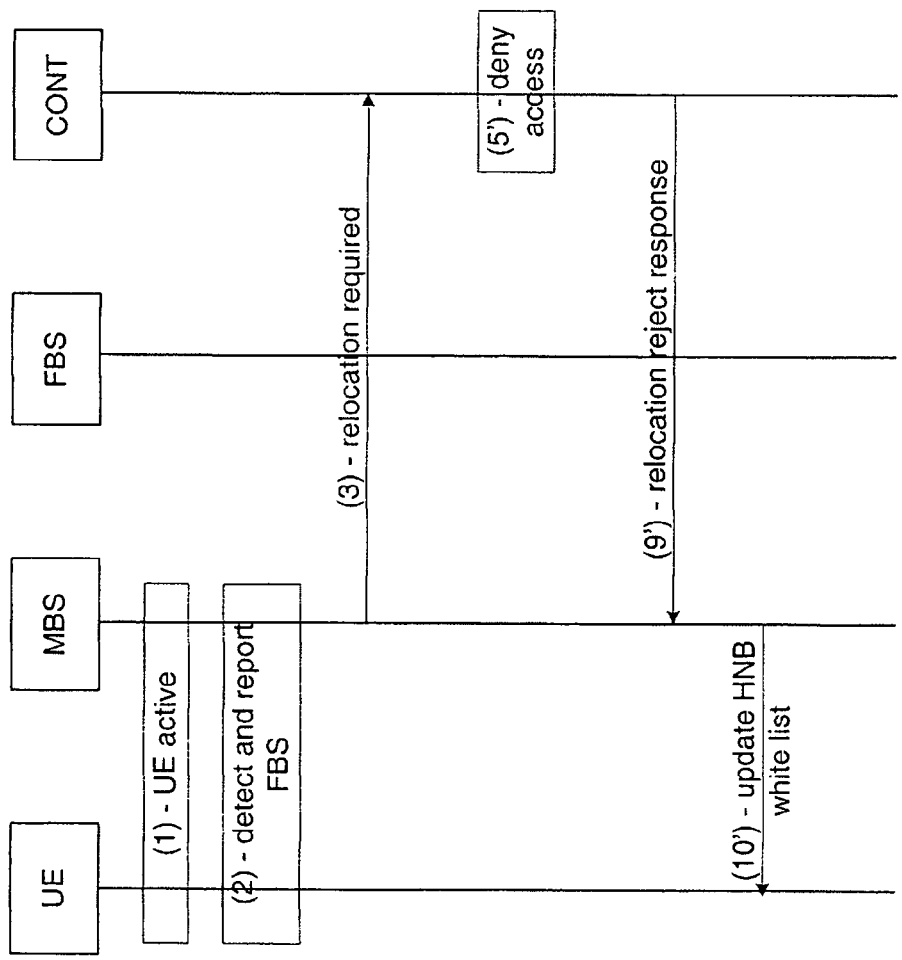
Figure 3:
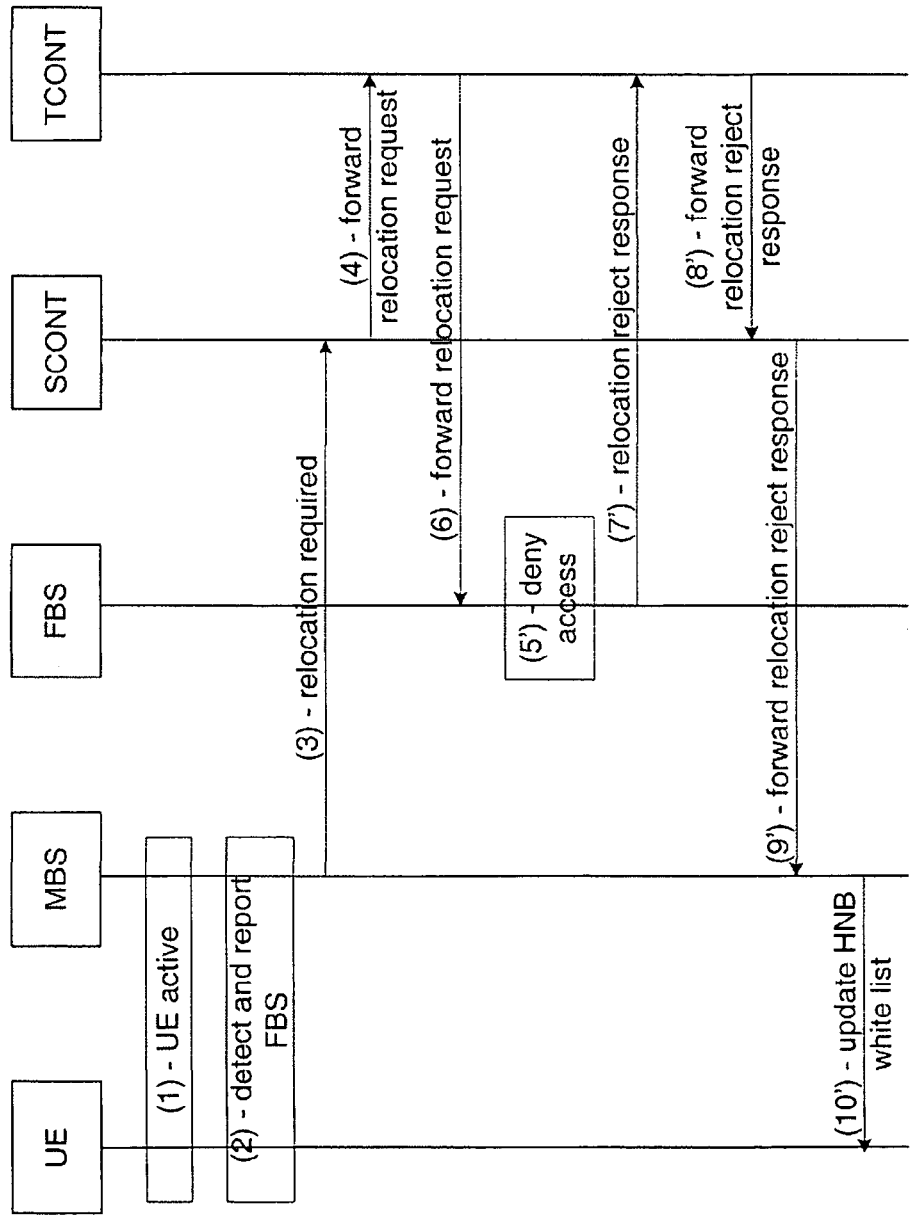
Figures 3, 4:
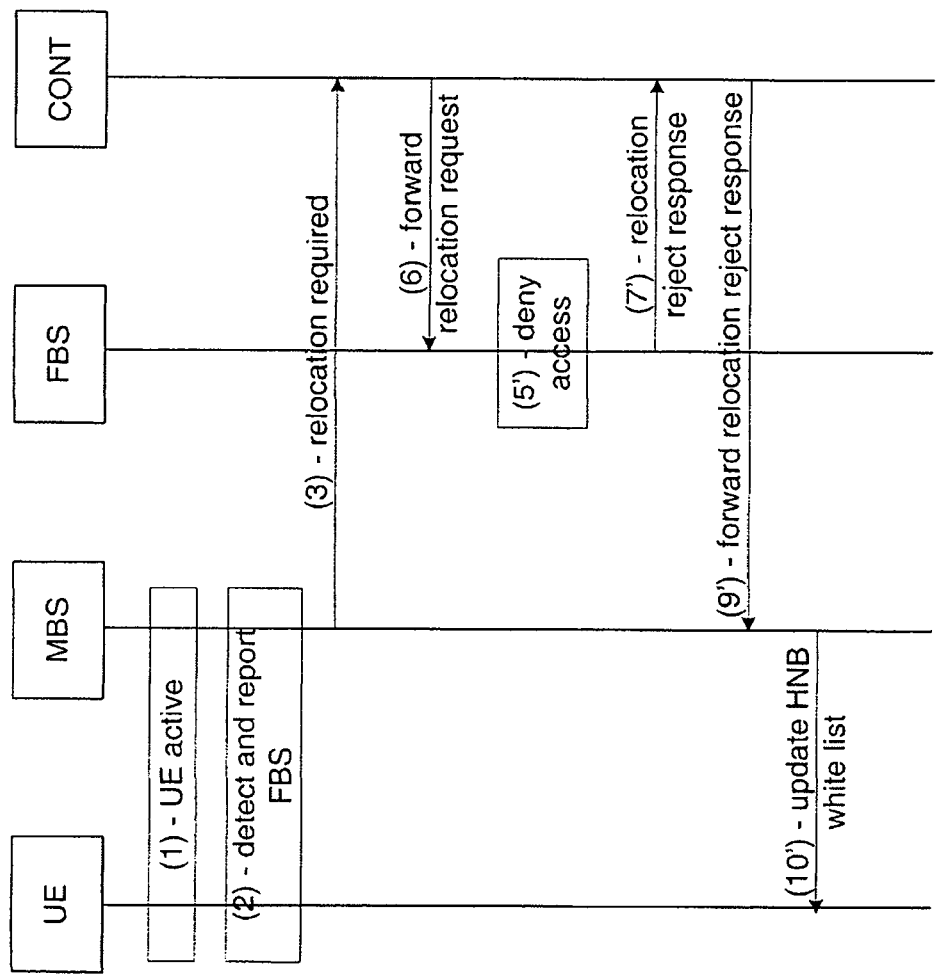
Figure 4:
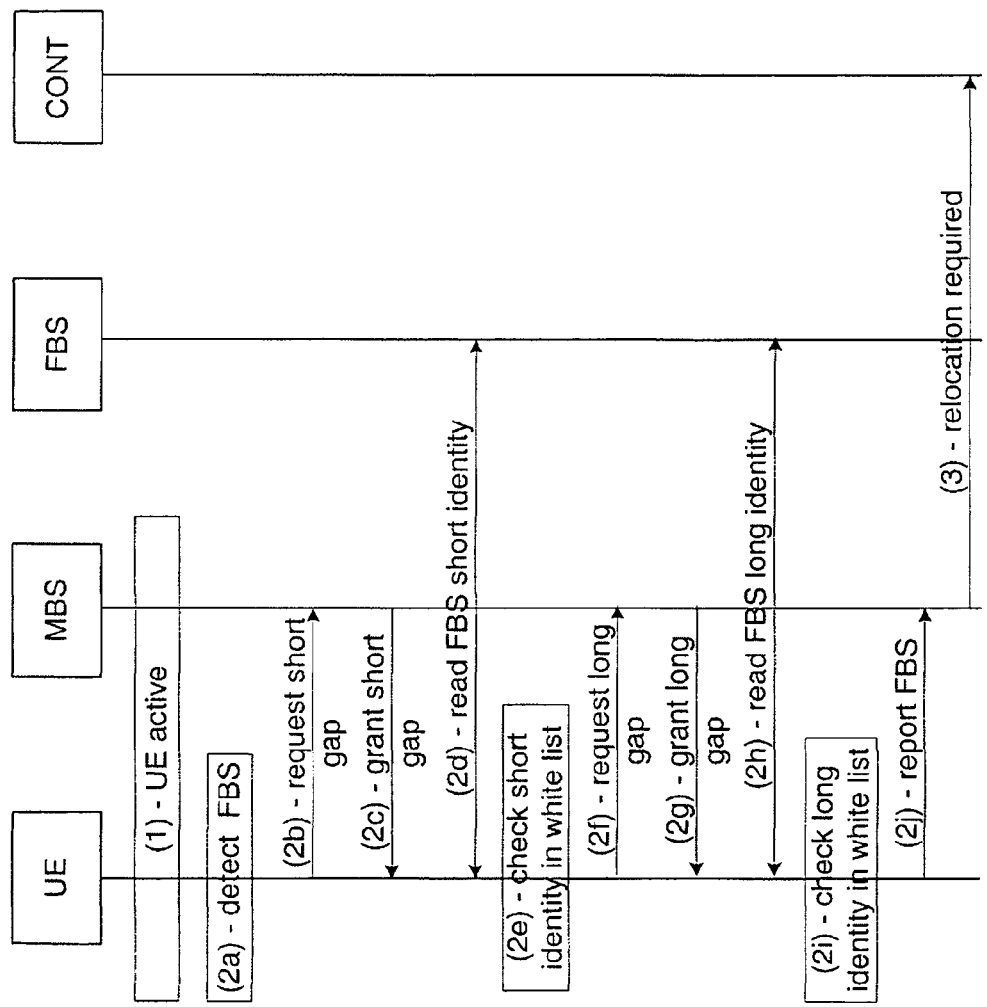

FIG. 2-4 is an example chart of signaling flow between nodes of the wireless network for relocation when there is one mobility controller 140 involved and the target FBS 120 decides whether access is allowed. The signaling flow is similar to that of FIG. 2-3 except that the signals between the mobility controllers—signals (4) and (8)—are unnecessary.

FIGS. 2-1 through 2-4 illustrate the signal flows when the relocation is successful. FIGS. 3-1 through 3-4 on the other hand illustrate the signal flows when the access control denies the relocation. FIG. 3-1 is an example chart of signaling flow between nodes of the wireless network not allowing relocation where source and target mobility controllers 140 and 150 are involved and the decision to deny access is made by the target mobility controller 150. The sequence can be generally described as follows:

(1) The UE 130 enters an active state in a macro cell controlled by the source MBS 120.
(2) The UE 130 detects the target FBS 120 and reports the target FBS 120 to the source MBS 130.
(3) The source MBS 130 sends the Relocation Required message to the source mobility controller 140. The message includes the target FBS 120 identification. For example in LTE, the TAI+CI can be reported.
(4) The source mobility controller 140 identifies the target mobility controller 150 controlling the target FBS 120 and forwards the Relocation Request to the target mobility controller 150. The message includes, among other information, the UE 130 identification (i.e., the IMSI) and the target FBS identifier (i.e., the long identity).
(5') The target mobility controller 150 performs access control for active mode users and decides to deny the relocation request.
(8') The target mobility controller 150 sends a relocation reject response to the source mobility controller 140.
(9') The source mobility controller 140 forwards the relocation reject response to the source MBS 120.
(10') The source MBS 120 sends a white list update command to the UE 130.

Unlike FIG. 2-1, the signals (6) and (7) to notify the target FBS 120 are unnecessary since the request is denied. Also, in the relocation reject response (8'), the target mobility controller 150 can include information on the cause of the reject as well as the FBS identifier. For example, the cause may be that the UE 130 is not on the accessible list in the database. Another reason may be that the target FBS 120 is currently serving a maximum number of other UEs. The FBS identifier can be TAI+CI for LTE. If the cause of the rejection indicated that the UE 130 is not allowed to access the target FBS 120, then the white list of the UE 130 can be updated accordingly, for example, by removing the target FBS 120 from the white list.

FIG. 3-2 is an example chart of signaling flow between nodes of the wireless network not allowing relocation when there is one mobility controller 140 involved and the decision is made by the mobility controller 140. The signaling flow is similar to that of FIG. 3-1 except that the signals between the mobility controllers—signals (4) and (8')—are now unnecessary.

FIG. 3-3 is an example chart of signaling flow between nodes of the wireless network not allowing relocation where source and target mobility controllers 140 and 150 are involved and the decision to deny is made by the FBS 120. The signaling flow is similar to that of FIG. 3-1 except that the access control decision (5') is performed in the target FBS 120. Also signals (6) to forward the relocation request from the target mobility controller 150 to the target FBS 120 and (7') to send a relocation reject response from the target FBS 120 to the target mobility controller 150 are included to complete the signal flow.

FIG. 3-4 is an example chart of signaling flow between nodes of the wireless network not allowing relocation when there is one mobility controller 140 involved and the decision is made by the FBS 120. The signaling flow is similar to that of FIG. 3-3 except that the signals between the mobility controllers—signals (4) and (8')—are unnecessary.

Each femto cell associated with a FBS can have at least two different identities associated with it, so called "short identity" and "long identity". The short identity is an identifier on the lower radio layers and does not necessarily uniquely identify the femto cell (the FBS) as it is reused in the radio access network. The long identity, also referred to as the "long cell identifier", can be included as part of the system information and uniquely identifies the femto cell. The long identify of the FBS can be sufficient to trigger the handover/relocation from the source macro cell to the target femto cell, i.e., from the source MBS 110 to the target FBS 120.

As the names imply, the long identity is longer relative to the short identity. Thus, it takes less time to read the short identity than the long identity. To determine ultimately whether the UE 130 can access the particular FBS 120 or not, the determination should be made based on the unique identification of the FBS 120, i.e., based on the long identity. However, if the FBS can be removed as a possibility for relocation based on its short identity alone, then there is no need to determine the long identity. Thus, the use of the short identity can potentially save time and resources.

To allow for reading of either the short or the long identity, the network, and specifically the source MBS 110, grants "gaps" which are predefined time periods in which no downlink data from the source MBS 110 to the UE 130 is sent. The gaps allow the UE 130 opportunities to read the short and long identities transmitted from the target FBS 120. Since the short identity takes less time to read, if the FBS can be removed as a possible target on the basis of the short identity alone, the amount of time in which the source MBS 110 does not transmit data is minimized, which is an advantage.

The concept of the white list is now explained in further detail. As noted above, the white list can be populated and maintained in the UE 130. In general, the UE 130 can read the broadcasted system information in a cell (either macro or femto) and can identify that the base station is a FBS. The UE 130 can read the long identity of the FBS to further check the contents of the white list to determine whether the UE 130 is allowed to access that specific FBS. Thus, the main issue becomes deciding when to trigger the gaps for measurements and reading of the short and long identities for the FBSs either on the same carrier as the source MBS 110 or on a different carrier. Also, if the relocation is unsuccessful, it is a simple matter to update the white list in the UE 130. It is preferred that the relocation be triggered without any preconfiguration of target FBSs information in the source MBSs. The white list allows for this to occur.

In an embodiment, the UE 130 triggers the gaps for measurements. That is, the UE 130 determines when it needs the gaps and requests these from the network. In this embodiment, the white list is extended with additional information about the location of potential FBSs so that the UE 130 can optimize the search for the FBSs. The outcome is that the UE 130 reports all the needed FBS identifiers to the current source MBS 110 using extended measurement reports so that relocation into to the target FBS 120 can be triggered dynamically without any preconfigured information in the source MBS 110. It is preferred that the UE 130 can report on unknown cells operating in different frequencies and/or technologies. These reports can result in the source MBS 110 triggering the relocation.

It is also preferred the UE 130 is allowed to report on cells on all the needed frequencies (i.e., not only the current frequency) and radio access technologies (RATs). Further, it is preferred that the UE 130 be allowed to report unique information about the detected FBS (i.e., not only its scrambling code). This can allow for different types of handovers, for example, from E-UTRAN MBS to GSM FBS which is a type of an inter-RAT handover, from E-UTRAN MBS to WCDMA FBS which is another type of the inter-RAT handover, and/or from E-UTRAN MBS to E-UTRAN FBS, either as inter-frequency or as intra-frequency handovers. Different types of identifiers may be utilized. For example, in the E-UTRAN MBS to GSM FBS handover, the UE can report the long identity in a GSM format, i.e., report the CGI (cell global identity). This identity can be used to uniquely identify the target GSM femto cell.

Once the source MBS 110 receives the measurement report indicating that a FBS is detected, it is possible to trigger the relocation to this target FBS 120 based on the received information identifying the target FBS 120.

As described above, the UE 130 needs gaps to be able to read the different FBS identities and to be able to report these to the source MBS 110. The UE 130 identifies when it should try to detect a FBS and when to request the gaps from the network. The contents of the white list allows the UE 130 perform these functions. The white list can include one or more of the following for each of one or more FBSs in the white list:

Long identity (Long Cell Identity);
Short Identity;
Short range radio identifiers (e.g., SSID for Wi-Fi, Bluetooth device address for Bluetooth, and the like);
One or more overlaying macro cells—i.e., the macro cells the UE can "hear" in the location of the femto cell);
Timing advance of the one or more macro cells;
Location of the FBS; and
One or more normal access times for the FBS.

This information can be used in any one or more of the following ways by the UE 130 to detect the need for gaps:
a. The UE identifies a short identity on the current carrier and this identity is listed in the white list as a FBS;
b. The UE receives information via its short range radio;
c. The UE is handed over to a MBS whose macro cell is listed in the white list as overlaying femto cell for a FBS. Note this could also be a combination of more than one cell that the UE can detect in the current location;

d. The timing advance in the macro cell of the source MBS matches the white list contents;
e. The UE, determines that its location—e.g., through a GPS-device located within the UE—matches, within a predetermined margin, the white list contents;
f. Time of the day matches, within a predetermined margin, of when a FBS is normally accessed;
g. Any commination of the above ways.

When the UE 130 detects the need for the gaps, it requests these from the network (source MBS 110 for example) and network can allows this. Once UE detects a FBS during the gaps, it can further check if the read information matches the white list contents. In some cases, the UE may initially request short gaps and if the found information (e.g., short identity) matches information in the white list, then the UE may request even longer gaps so that is able to read more information about the detected FBS (e.g., long identity). If the read long identity of the detected FBS is an allowed cell according to white list, then the UE reports this identity to the current serving cell.

Some variants are possible depending on whether the source MBS 110 and the target FBS 120 are on the same carrier. If both are on the same carrier, then the UE 130 can detect the FBS and the associated short identity without the short gap. In this instance, the UE may directly request the long gaps.

In another variant, the UE 130 can be a "dual-receiver" type. This type of UE doesn't need any "gaps" to be able to read the long identities of the FBSs. In this instance, it is enough that the UE 130 reads the needed information and checks the content of the white list to decide whether the detected FBS should be reported to the source MBS 110.

FIG. 4 illustrates an example signaling flow between the UE 130 and the source MBS 110 to detect and report the target FBS 120 after the UE 130 enters the active state (1) in the macro cell of the source MBS 110. In FIG. 4, the FBS is dynamically detected by the UE 120. The source MBS 110 and the target FBS 120 are assumed to be on different carriers. Also, when the FBS is powered on and the unique identifier(s) are allocated for the FBS, these identifiers are broadcasted as part of the system information. No special information needs to be preconfigured in the source MBS 110 regarding the individual FBSs. The sequence of detecting and reporting (2) the target FBS 120 can be generally described as follows:
(2a) The UE 130 detects a presence of a FBS which could be a potential target FBS for the relocation. That is, the UE 130 determines that a FBS may be in the vicinity.
(2b) The UE 130 requests for a short gap to the source MBS 120. The short gap is a time slot in which the source MBS 120 will not transmit data to the UE 130 and is sufficient to read the short identity.
(2c) The source MBS 120 grants the short gap.
(2d) The UE 130 reads a short identity transmitted by the target FBS 120.
(2e) The UE 130 checks the white list to determine if relocation to the FBS 120 is possible based on the short identity.
(2f) When it is determined that the relocation is possible, the UE 130 requests for a long gap to the source MBS 120. The long gap is also a time slot in which the source MBS 120 will not transmit data to the UE 130 and is sufficient to read the long identity. The long gap is longer in duration than the short gap.
(2g) The source MBS 120 grants the long gap.
(2h) The UE 130 reads a long identity transmitted by the target FBS 120.
(2i) The UE 130 checks the white list to determine if relocation to the FBS 120 is possible based on the long identity.
(2j) When it is determined that the relocation is possible, the UE 130 reports relocation is possible and includes the identity of the target FBS 120 to the source MBS 120.

The signaling flow picks up from (3) as detailed in FIGS. 2-1 through 3-4. In the examples, the network provides the UE 130 identification (IMSI) to the mobility controller 140, 150 or to the target FBS 120. As such, it is not necessary to verify or to challenge the received IMSI. Thus, the mobility controller 140, 150 or the target FBS 120 can perform the access control in a similar way as the idle case. Either the mobility controller 140, 150 or the target FBS 120 or both can be configured with the allowed IMSIs per each FBS or this information can be stored in a central database with access from the mobility controller 140, 150 or the target FBS 120.

Again, the possibility and the time needed to read the two identities varies depending on whether the current serving source MBS and the target FBS are on the same carrier (frequency) or not. If both are on the same carrier, then the UE is capable to detect the short identity of the FBS without requesting the short gap, but more time is needed to read the long identity This is similar in principle as the "Compressed Mode" in WCDMA.

Figure 5:
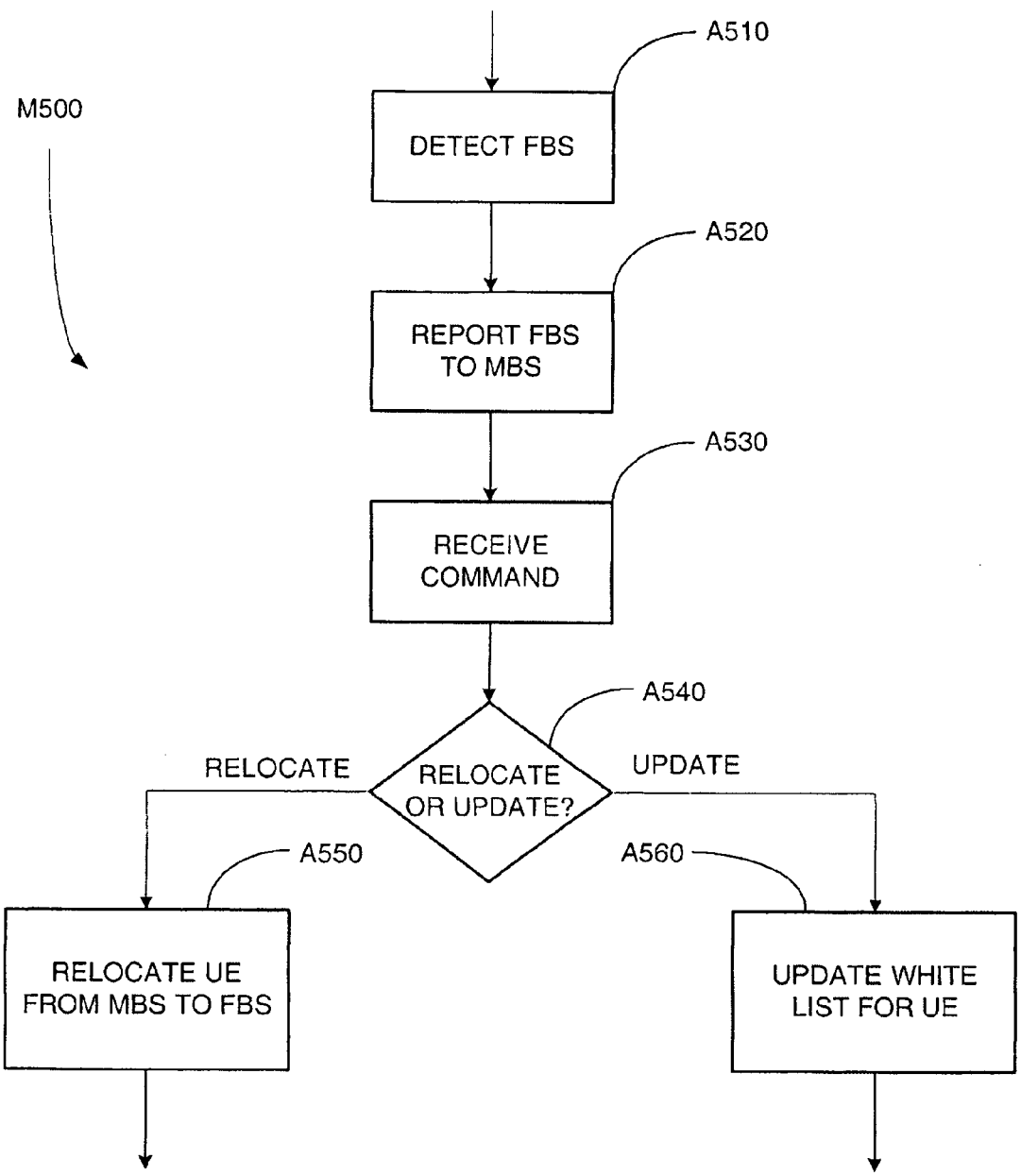
FIG. 5 is a flow chart of an example method to perform relocation of a user equipment from a source macro base station to a target femto base station from the perspective of the user equipment.

FIG. 5 is a flow chart of an example method M500 to perform a relocation of a user equipment (UE 130) from a source macro base station (MBS 110) to a target femto base station (FBS 120) from the perspective of the user equipment. The method begins with detecting the target FBS 120 based on a white list of the UE 130 in A510. The detected target FBS 120 is reported to the source MBS in A520. See sequence (2) in FIGS. 2-1 through 3-4.

The UE 130 then receives a command from the source MBS 110 in A530 and the type of command is determined in A540. If the command is to relocate—i.e., the access has been granted—then the UE 130 performs the relocation in A550. See sequences (10) and (11) in FIGS. 2-1 through 2-4. If the command is to update the white list—i.e., the access has been denied—then the UE 130 performs the updates the white list in A560. See sequence (10') in FIGS. 3-1 through 3-4.

The white list includes information on one or more FBSs available to provide connectivity to the UE 130. This information can include for each FBS a short identity and a long identity. The UE 130 can determine that relocation to the target FBS 120 is possible based on the short and the long identities of the target FBS 120.

When the UE 130 updates the white list after a denial in A560, the white list is modified to indicate that the UE 130 is not allowed to access the target FBS 120. In one embodiment, the entry for the FBS 120 may be removed altogether. In another embodiment, the entry for the FBS 120 may be kept except for a change in the "allowable" status.

Figure 6:
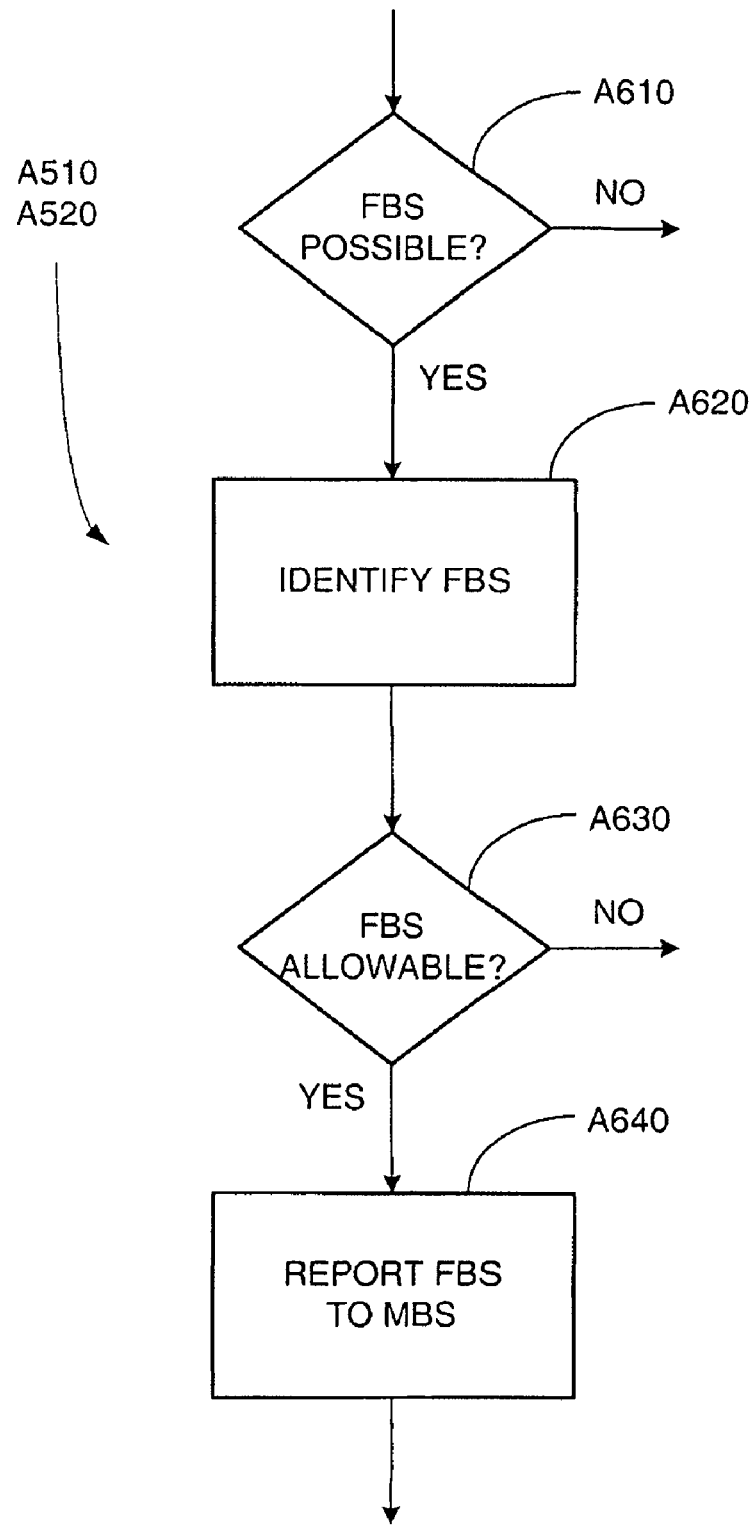
FIG. 6 is a flow chart of an example method to detect and report target femto base station to the source macro base station.

FIG. 6 is a flow chart of an example method of performing A510 and A520 of FIG. 5. In the method, the UE 130 can determine whether there are possible FBSs for the relocation based on the white list in A610. This can be determined in many ways. The examples of such ways include:

A short identity transmitted by a FBS is listed in the white list as being a FBS;
The source MBS 110 is listed in the white list as having a macro cell that overlays one or more femto cell areas corresponding to one or more FBSs;
A timing advance of the source MBS 110 may match one or more timing advances in the white list;
A current location of the UE 130 is within a predetermined distance of one or more FBSs in the white list:
A current time matches within a predetermined tolerance of one or more normal access times listed for one or more femto base station in the white list. This is useful for a user who maintains a very regular schedule of activities.

The UE 130 may continuously search for potential target FBSs in A610. However, this may drain the battery unnecessarily. Thus, in a non-limiting aspect, the UE 130 may be manually triggered to detect for possible FBSs. For example, when a user arrives at his home or office in which he/she knows that there is a FBS that the UE 130 is allowed to access, the user may simply initiate A610 by pushing a button on the UE 130. The trigger may be automatic as well. In another non-limiting aspect, the UE 130 may be arranged to listen for FBSs periodically, for example, once every minute. In this way, minimal battery power is consumed while retaining the advantage of automatic detection.

Regardless of whether the trigger is manual or automatic, alternative short range wireless protocol signals—such as Wi-Fi or Bluetooth—may be used when the UE 130 is properly equipped. That is, the UE 130 is capable of communicating via the short range wireless signal in addition to being capable of communicating with the MBS and FBS via 3GPP wireless signals. One advantage of using the alternative short range wireless signals is that if an FBS is detected, it is relatively assured that the FBS is nearby. Also, if the FBS transmits the short and/or long identities using the alternative short range wireless signals, then the need to create measurement gaps so that the identities can be read would be removed.

If in A610 it is determined that there are possible FBSs for relocation, then the UE 130 proceeds to identify a FBS as a possible target FBS in A620. The UE 130 determines if relocation is allowable to the identified FBS in A630. If the UE 130 determines that the relocation is allowable, the UE 130 reports the target FBS 120 to the source MBS 110 in A640.

Figure 7:
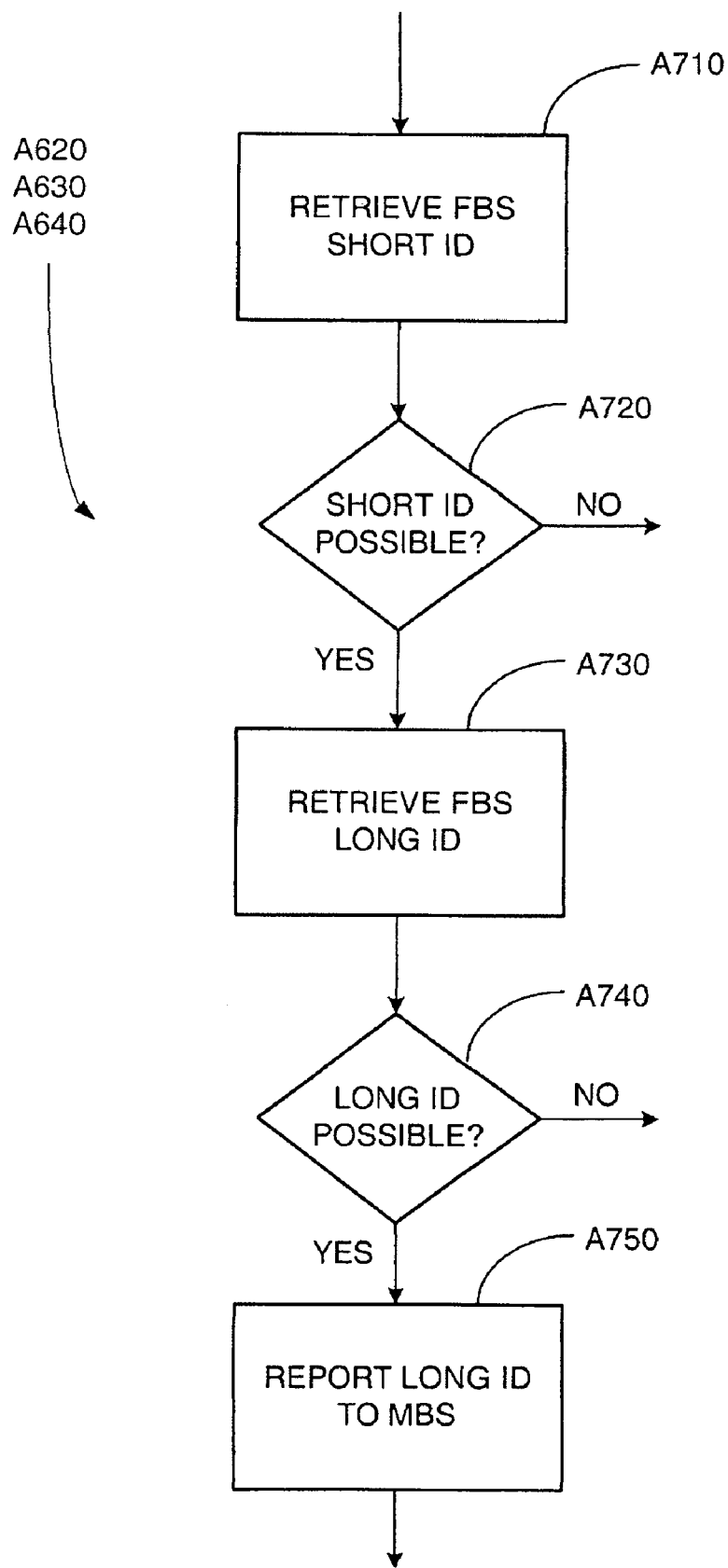
FIG. 7 is a flow chart of an example method to determine whether a detected femto base station is a possible target femto base station.

FIG. 7 is a flow chart of an example method of performing A620, A630 and A640 of FIG. 6. Assuming that the source MBS 110 and the detected FBS operate in different carriers, the UE 130 retrieves the short identification of the detected FBS in A710. See sequences (2a)-(2d) in FIG. 4. Then in A720, the UE 130 determines if the detected FBS is a possible candidate for relocation based on the short identity. See sequence (2e) in FIG. 4. If the UE 130 determines based on the short identity that the relocation to the FBS is possible, then in A730, the UE 130 retrieves the long identity. See sequences (2f)-(2h) in FIG. 4. This is because the short identity does not necessarily identify the FBS uniquely. In A740, the UE 130 determines if the detected FBS is a possible candidate for relocation based on the long identity. If so, the long identity of the FBS is reported to the source MBS 110 in A750. See sequence (2i) in FIG. 4.

Figures 1, 8:
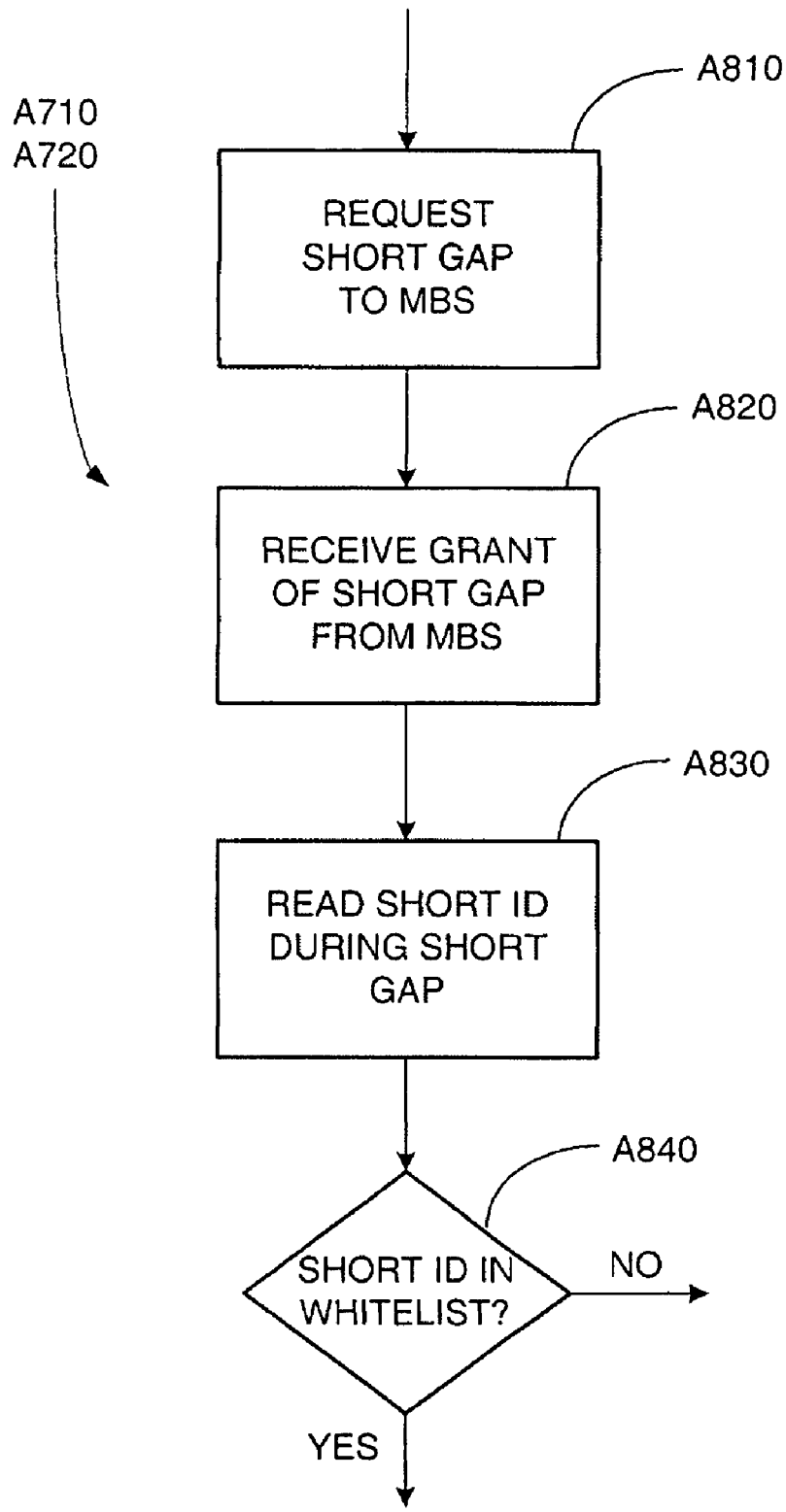
Figures 2, 8:
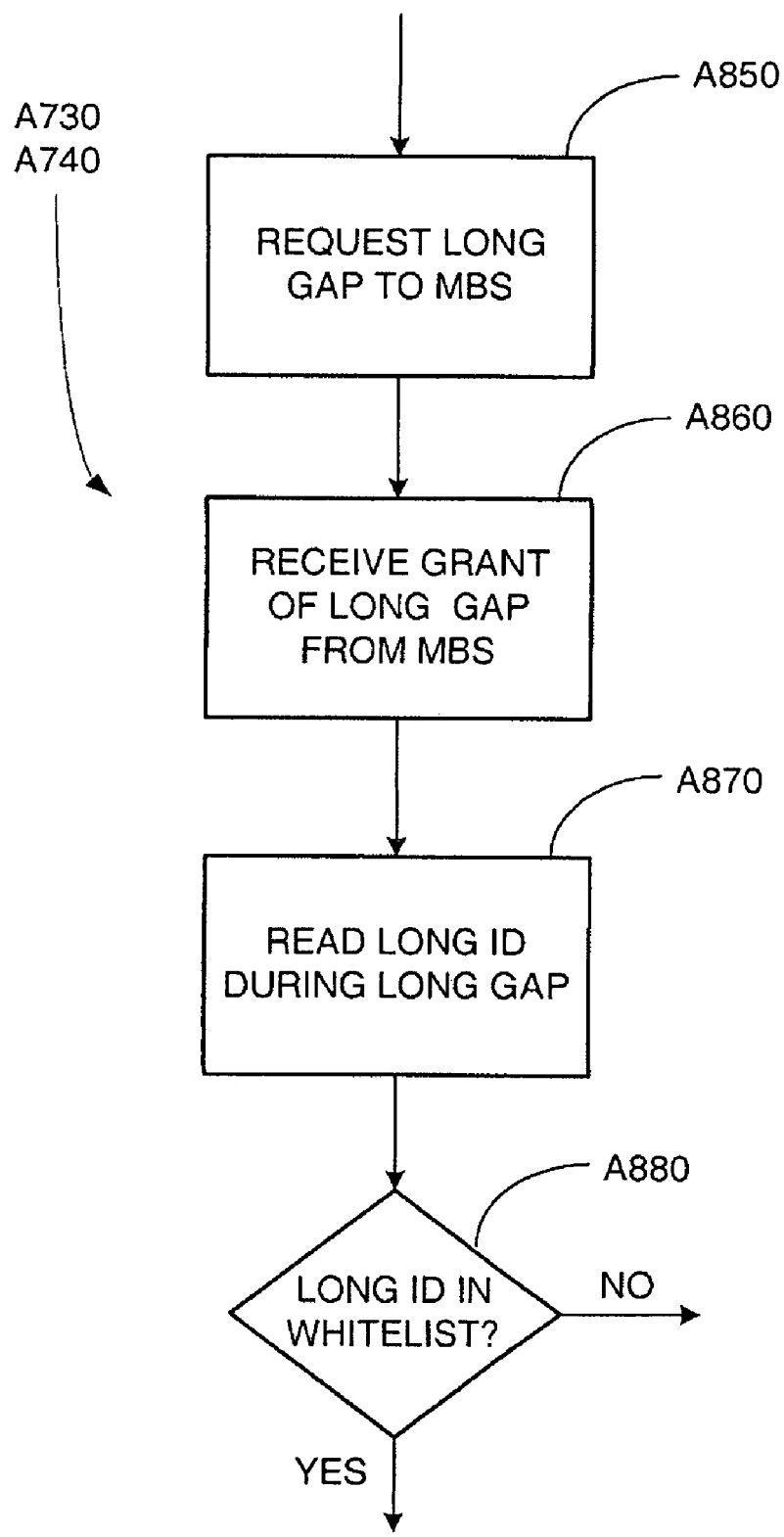

FIG. 8-1 is a flow chart of an example method for performing A710 and A720 of FIG. 7. The method begin in A810 in which the UE 130 requests the source MBS 110 for a short gap. See sequence (2b) in FIG. 4. The UE 130 receives a grant of the short gap from the source MBS 110 in A820. See sequence (2c) in FIG. 4. In A830, the UE 130 reads the short identity of the detected FBS during the short gap. See sequence (2d) in FIG. 4. In A840, the UE 130 determines whether the short identity read during the short gap is in the white list. If so, relocation to detected FBS is possible. See sequence (2e) in FIG. 4.

FIG. 8-2 is a flow chart of an example method for performing A730 and A740 of FIG. 7. The method begin in A850 in which the UE 130 requests the source MBS 110 for a long gap. See sequence (2f) in FIG. 4. The UE 130 receives a grant of the long gap from the source MBS 110 in A860. See sequence (2g) in FIG. 4. In A870, the UE 130 reads the long identity of the detected FBS during the long gap. See sequence (2h) in FIG. 4. In A880, the UE 130 determines whether the long identity read during the long gap is in the white list. See sequence (2i) in FIG. 4. If so, relocation to detected FBS is possible.

The source MBS 110 does not transmit downlink data during the short and long gaps. Also, the duration of the short and long gaps are sufficient to read the short and long identities, respectively.

FIGS. 8-1 and 8-2 illustrate the process when the source MBS 110 and the target FBS 120 operate on different carriers. However, if the two operate on the same carrier, then performing A620 and A630 of FIG. 6 become much simpler. The UE 130 can read the short identity without the short gap being specifically provided. That is, the UE 130 can proceed directly to requesting the long gap as illustrated in FIG. 9-1.

Figures 1, 9:
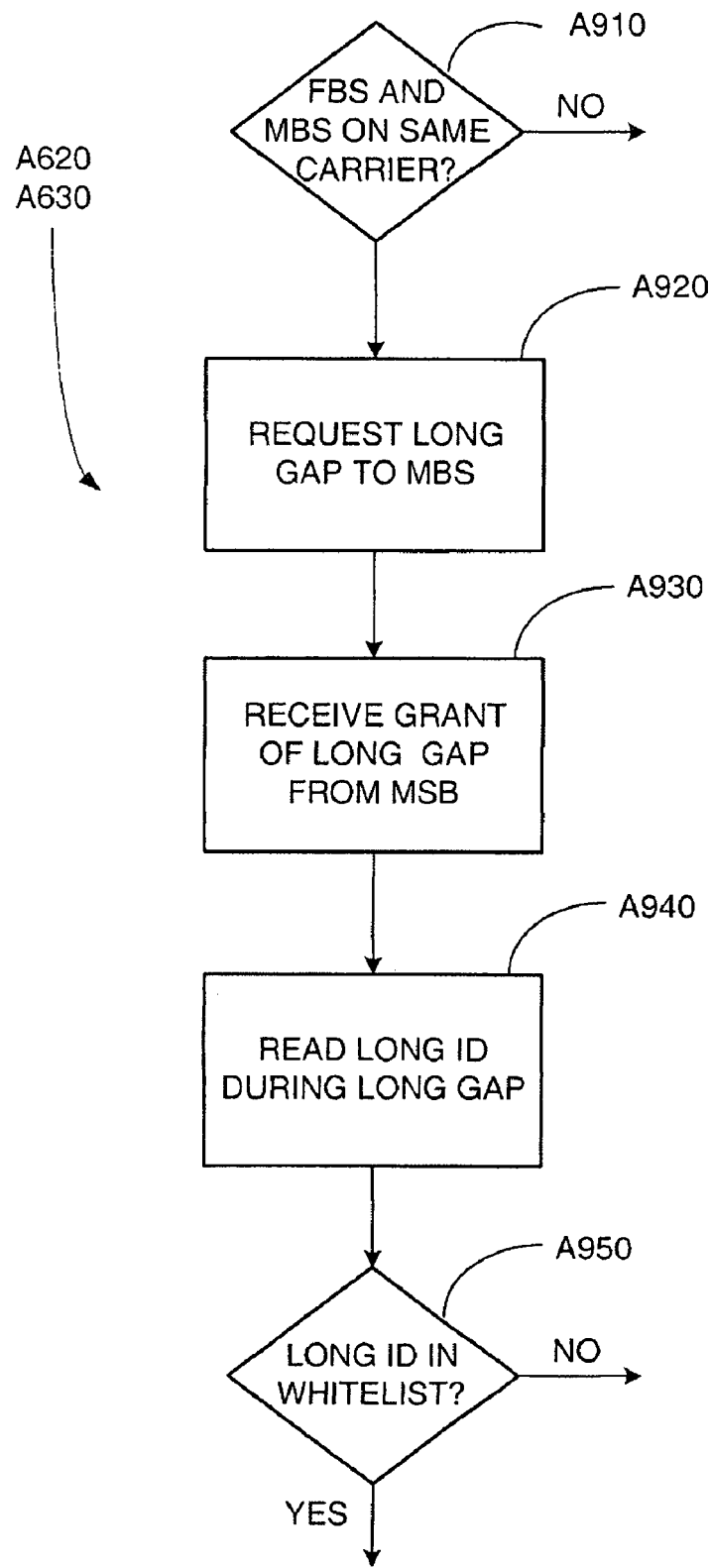
Figures 2, 9:
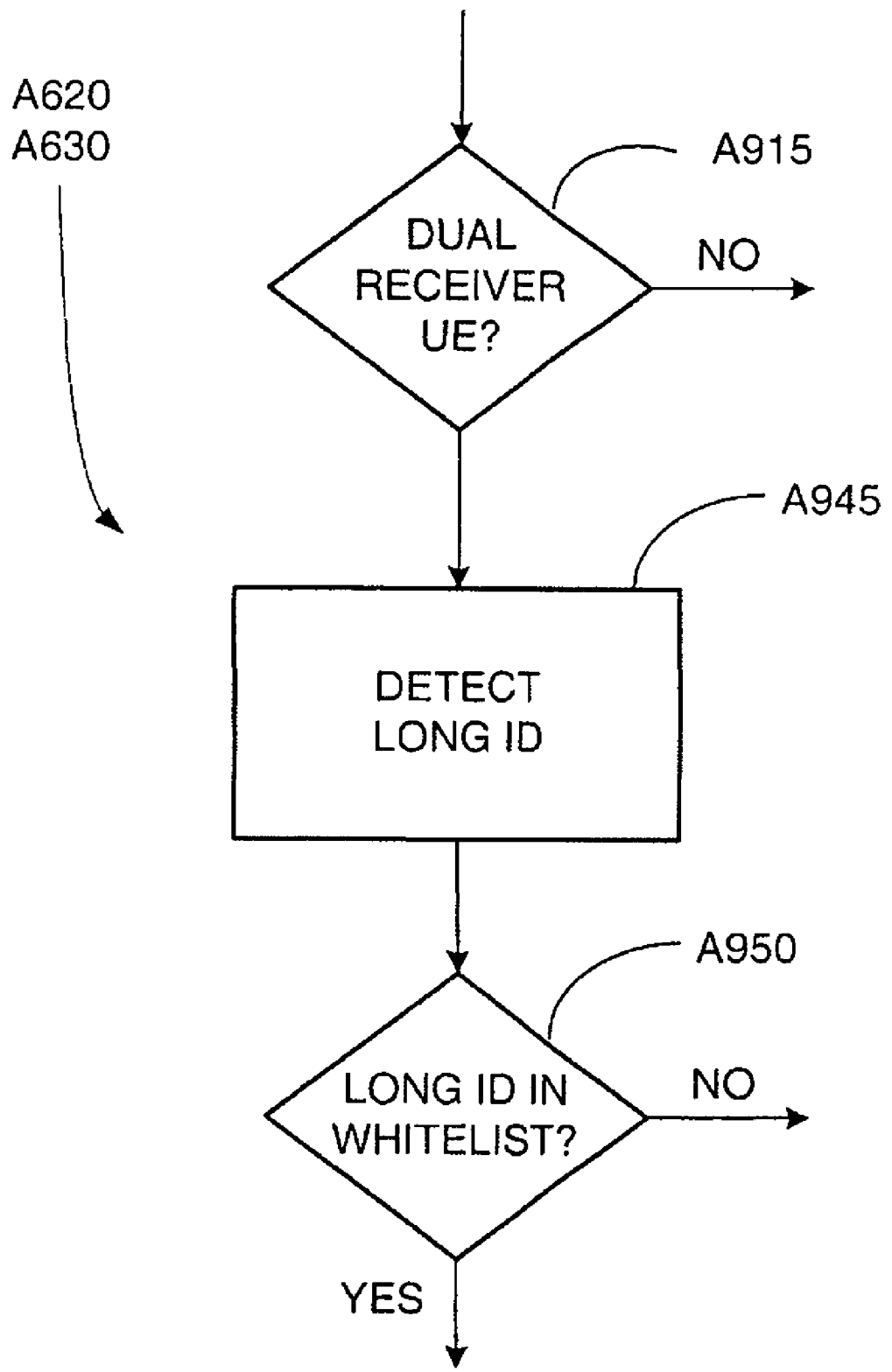

In FIG. 9-1, the UE 130 determines if the source MBS 110 and the detected FBS are on the same carrier in A910. If so, the UE 130 requests the source MBS 110 for a long gap in A920. See sequence (2j) in FIG. 4. This is because the UE 130 can read the short identity without requesting the short gap. The UE 130 receives the long gap grant from the source MBS 110 in A930. See sequence (2g) in FIG. 4. In A940, the UE 130 reads the long identity of the detected FBS during the long gap. See sequence (2h) in FIG. 4. In A950, the UE 130 determines whether the long identity read during the long gap is in the white list. See sequence (2i) in FIG. 4. If so, relocation to detected FBS is possible.

As another variant, the UE 130 may be a dual-receiver type device. In one non-limiting embodiment, the UE 130 is capable of communicating with MBSs via at least two 3GPP radio protocols (GSM, E-UTRAN, WCDMA, etc.) In another non-limiting embodiment, the UE 130 is capable of communicating with MBS via at least one 3GPP radio protocol and is capable of communicating via the alternative short range wireless protocol signals as noted above.

If the UE 130 is a dual-receiver type, then performing A620 and A630 become simpler still. The UE 130 need not request for the short and long gaps and can proceed directly to reading long identity transmitted from the FBS as illustrated in FIG. 9-2. In FIG. 9-2, the dual-receiver type UE 130 reads the long identity in A945. See sequence (2h) in FIG. 4. In A950, the UE 130 determines whether the long identity read during the long gap is in the white list. See sequence (2i) in FIG. 4. If so, relocation to detected FBS is possible.

Figure 10:
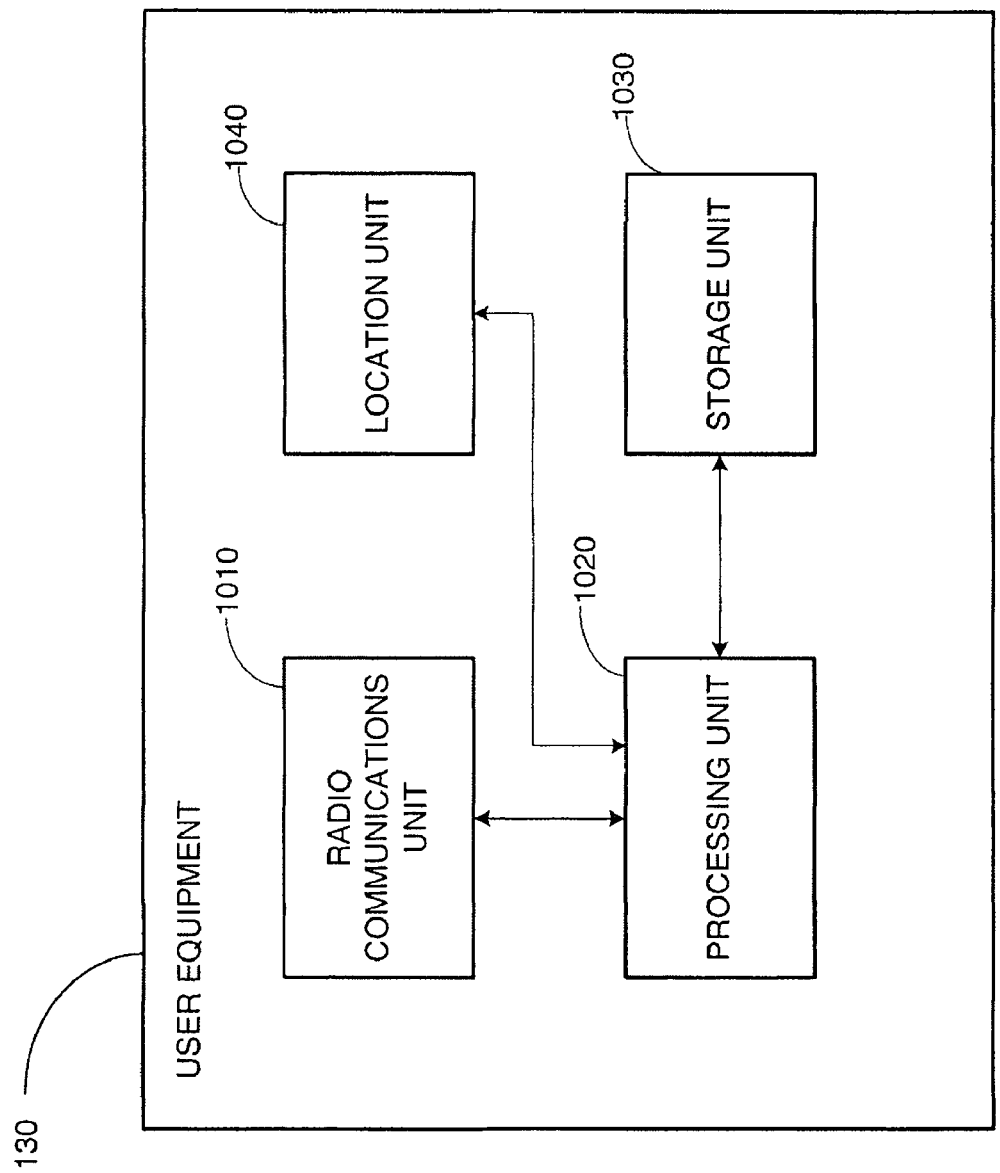
FIG. 10 illustrates an embodiment of a user equipment.

FIG. 10 illustrates an embodiment of a user equipment such as the UE 130. The UE 130 includes, among other elements, a radio communications unit 1010, a storage unit 1030 and a processing unit 1020. The radio communications unit 1010 is arranged to communicate with the source MBS 110 and the target FBS 120 in the network. The storage unit 1030 is arranged to store the white list as described above. The processing unit 1020 controls the radio communications unit 1010 and the storage unit 1030, and in general is arranged to control the operations of the UE 130 to perform the methods described above.

The UE 130 can also include a location unit 1040 to determine the current location of the UE 130. The location unit 1040 may be a GPS unit for example. The location determined by the location unit 1040 can be used by the processing unit 1020 to perform the described methods.

Figure 11:
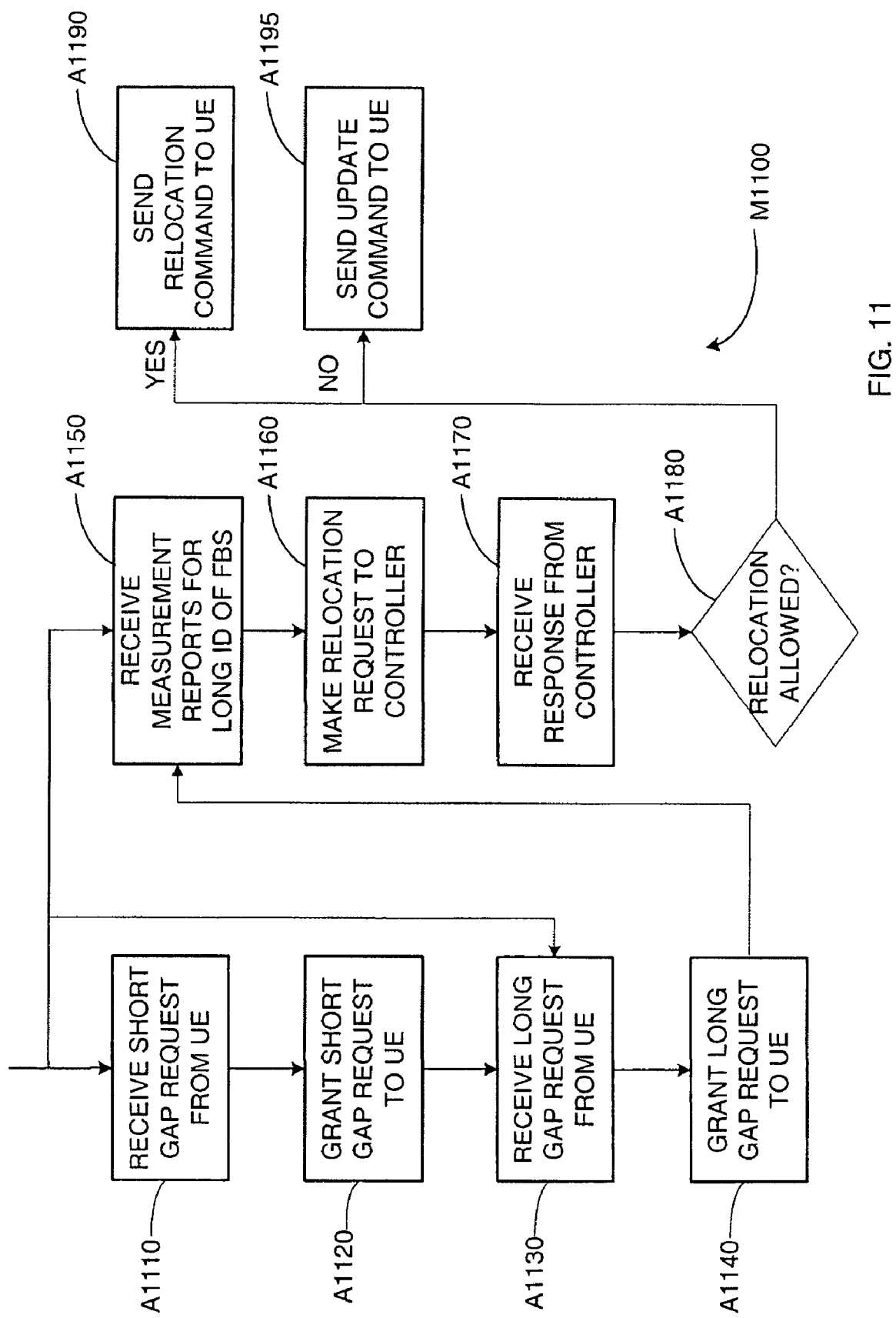
FIG. 11 is a flow chart of an example method to perform relocation of a user equipment from a source macro base station to a target femto base station from the perspective of the source macro base station.

FIG. 11 is a flow chart of an example method M1100 to perform the relocation of the UE 130 from the source MBS 110 to the target FBS 120 from the perspective of the source MBS 110. Note that the method can begin in A1110 (if the source MBS 110 and the target FBS 120 are on different carriers), A1130 (if the source MBS 110 and the target FBS 120 are on the same carrier) or A1150 (if the UE 130 is a dual-receiver type).

Respectively in A1110, A1120, A1130, A1140 and A1150, the source MBS 110 receives a request for the short gap from the UE 130 (sequence (2b) in FIG. 4), grants the short gap (sequence (2c)), receives a request for the long gap from the UE 130 (sequence (2f), grants the long gap (sequence (2g)), and receives measurement reports for the long identity of the target FBS 120 (sequence (2j)). In A1160 and A1170 respectively, the source MBS 110 sends a Relocation Required message to the mobility controller 140 (sequence (3) in FIGS. 2-1 through 3-4) and receives a response from the mobility controller 140. If the response indicates that relocation is allowed in A1180 (sequence (9) in FIGS. 2-1 through 2-4), then the source MBS 110 sends a command to relocate to the UE 130 in A1190. If the response indicates that relocation is denied in A1180 (sequence (9') in FIGS. 3-1 through 3-4), then the source MBS 110 sends a command to update the white list to the UE 130 in A1195.

Figure 12:
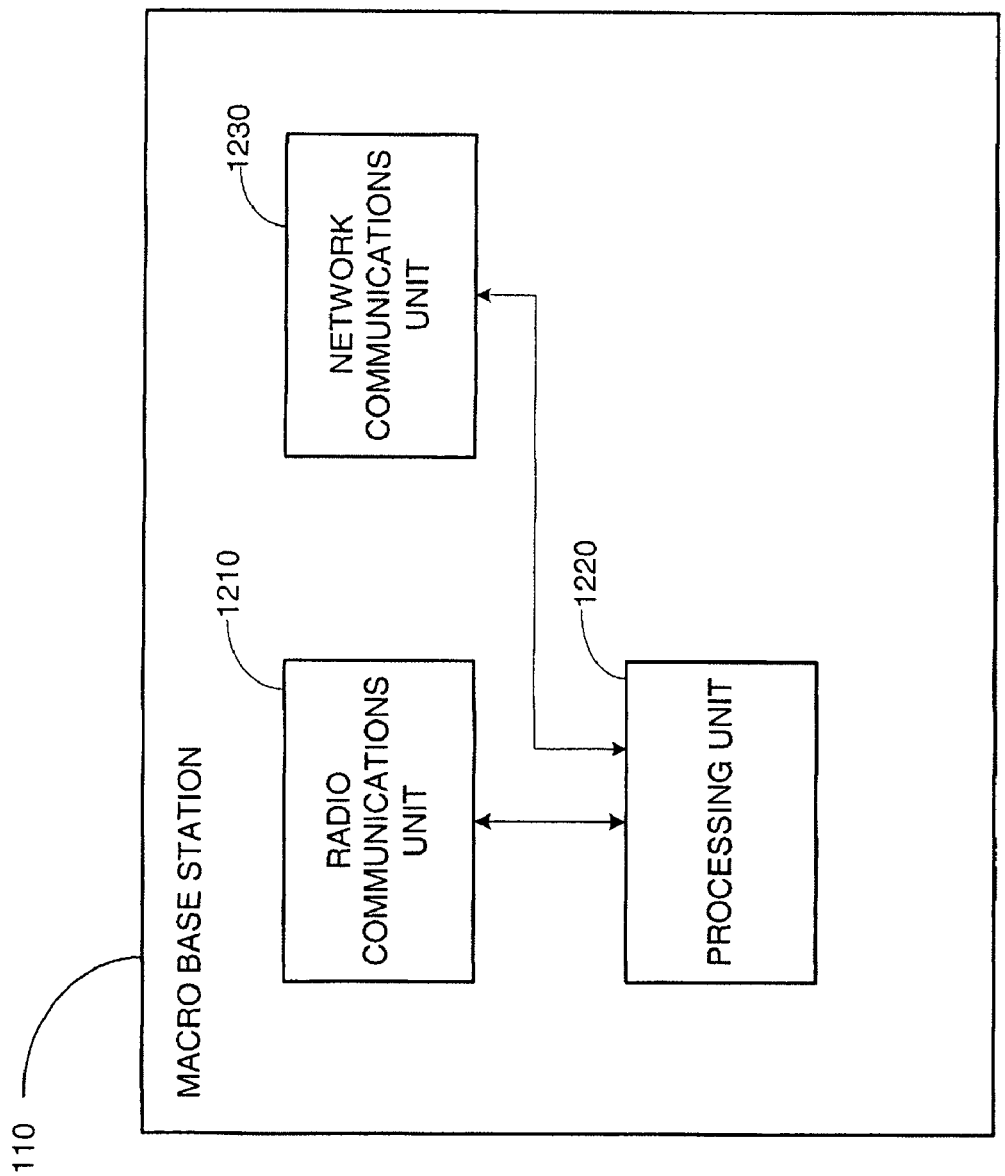
FIG. 12 illustrates an embodiment of a macro base station.

FIG. 12 illustrates an embodiment of a macro base station such as the source MBS 110. The MBS 110 includes, among other elements, a radio communications unit 1210 arranged to communicate with the UE 130 and a processing unit 1220 arranged to control the radio communications unit 1210 and to generally perform the methods described above. The MBS 110 can also include a network communications unit 1230 arranged to communicate with a mobility controller 140 also controlled by the processing unit 1220 to perform the methods.

Figure 13:
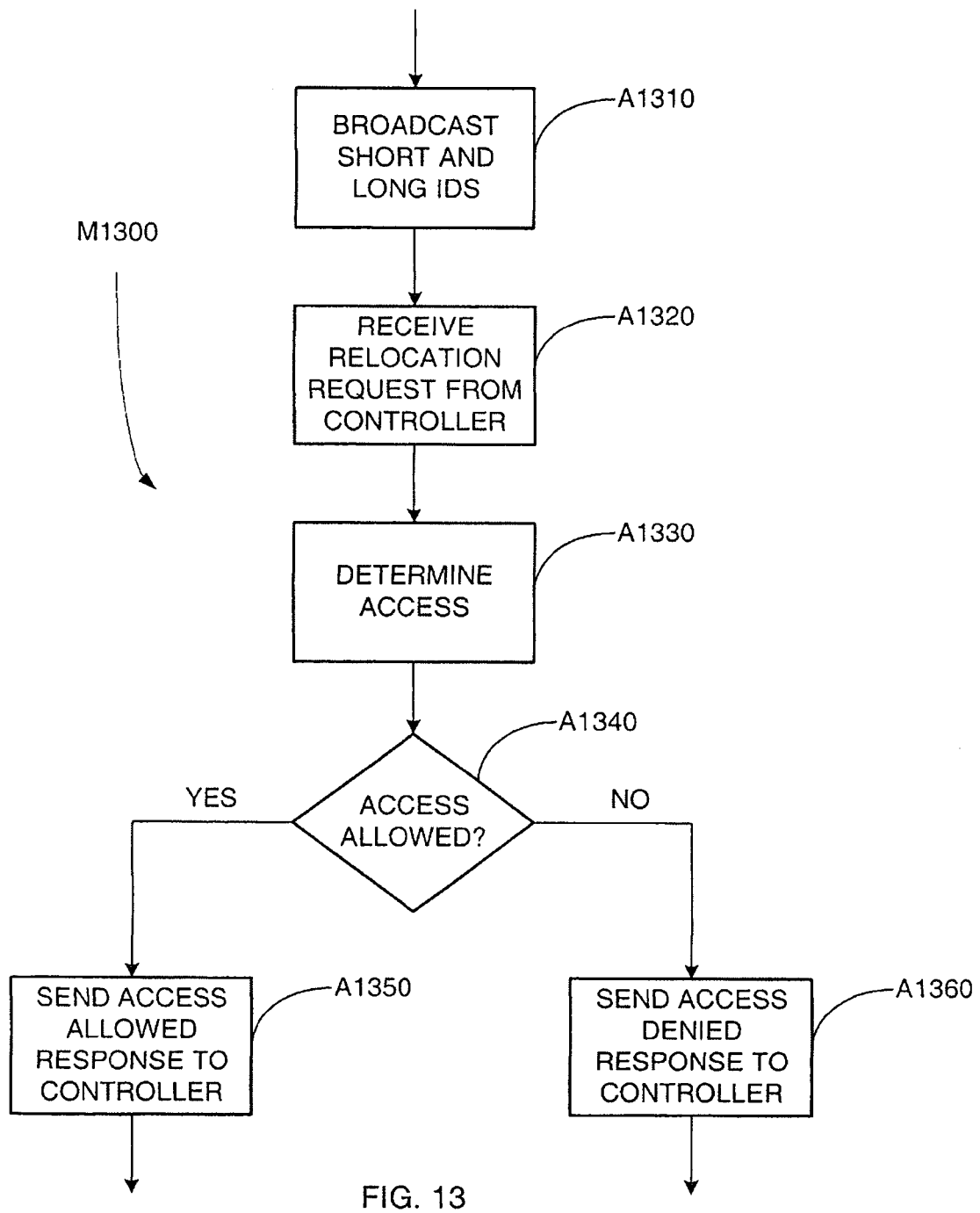
FIG. 13 is a flow chart of an example method to perform access control for a user equipment from the perspective of the femto base station.

FIG. 13 is a flow chart of an example method M1300 to perform access control for the UE 130 from the perspective of the target FBS 120. In the method, the target FBS 120 broadcasts its short and long identities in A1310. The identities can be broadcasted intermittently or continually. It is preferred that the identities are broadcasted at specific time intervals and/or in predetermined time slots. In A1320, the FBS 120 receives the relocation request from the mobility controller 140, 150 (sequence (6) in FIGS. 2-1 through 2-4 and 3-3 through 3-4). In A1330, the FBS 120 determines whether to allow access to the UE 130 or not. If access is allowed, then the FBS 120 sends an acknowledgment to the mobility controller 140, 150 in A1350 (sequence (7) in FIGS. 2-1 through 2-4). Otherwise, the FBS 120 sends a rejection response (sequence (7') in FIGS. 3-3 and 3-4).

Figure 14:
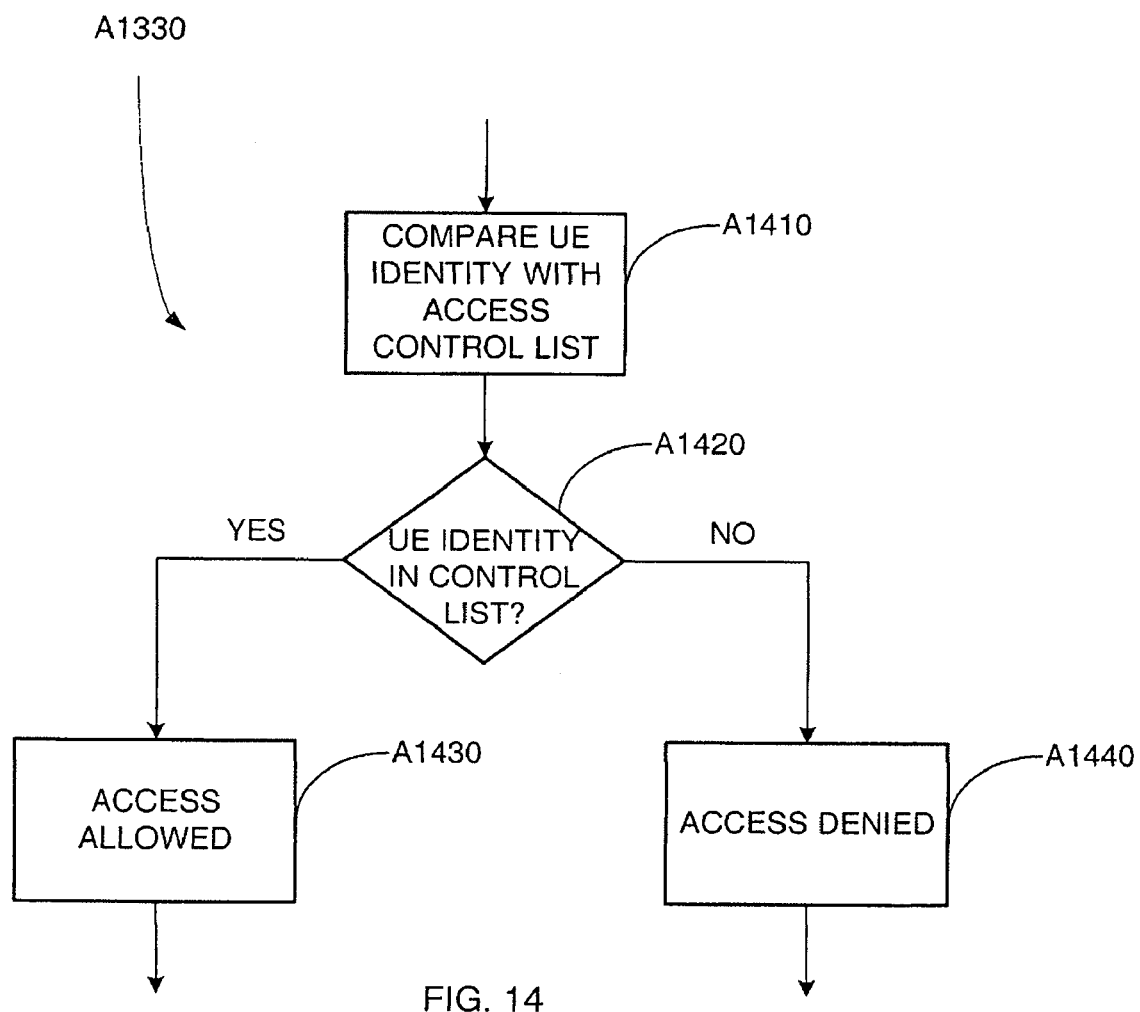
FIG. 14 is a flow chart of an example method to determine whether to allow access to the user equipment.

FIG. 14 is a flow chart of an example method to perform A1330 of FIG. 13. In the method, the FBS 120 compares the identity of the UE 130 against an access control list in A1410. The access control list can be maintained within the FBS 120 or can be maintained in a central database accessible to the FBS 120. The access control list includes identities of UEs that are allowed to access the target FBS 120. If the UE 130 is in the control list in A1420, then access is allowed in A1430. Other wise, the FBS 120 denies access in A1440.

Figure 15:
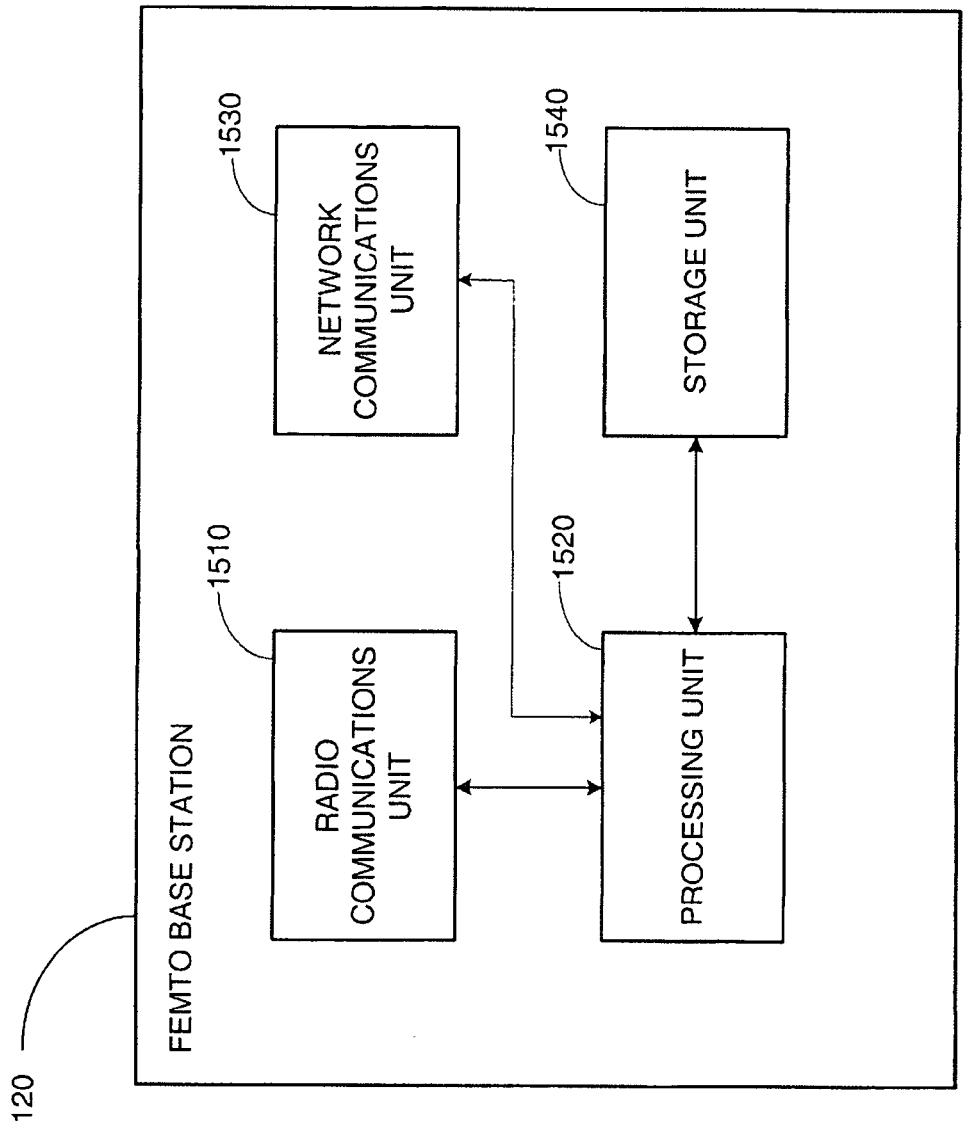
FIG. 15 illustrates an embodiment of a femto base station.

FIG. 15 illustrates an embodiment of a femto base station such as the FBS 120. The FBS 120 includes, among other elements, a radio communications unit 1510 arranged to communicate with the UE 130, a network communications unit 1530 arranged to communicate with a mobility controller 140, 150 of a network, and a processing unit 1520 arranged to control the radio communications unit 1510, the network communications unit 1530, and to generally perform the methods described above. The FBS 120 can also include a storage unit 1540 arranged to store the access control list. The access control list is accessible to the processing unit 1520.

Figures 1, 16:
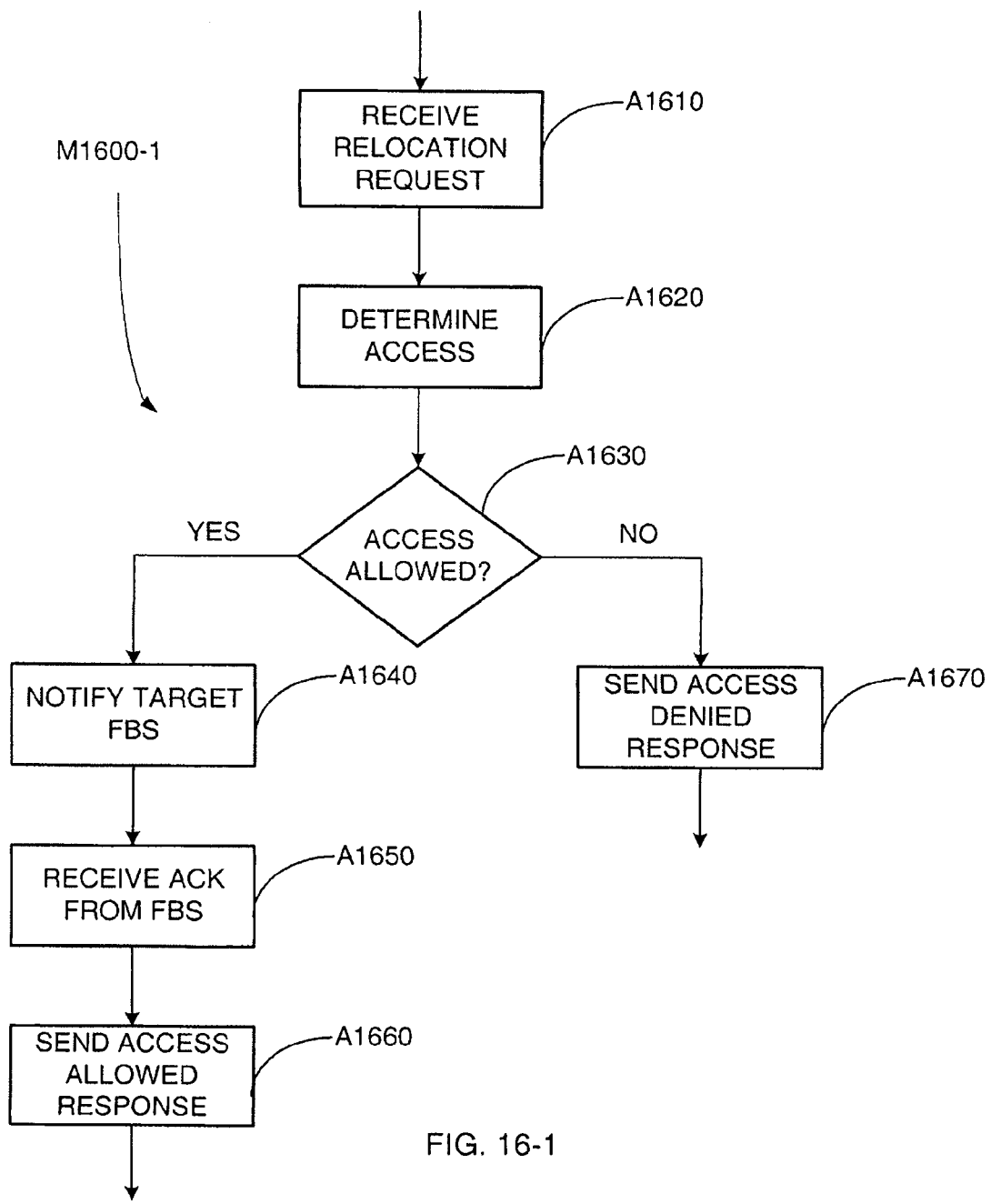
Figures 2, 16:
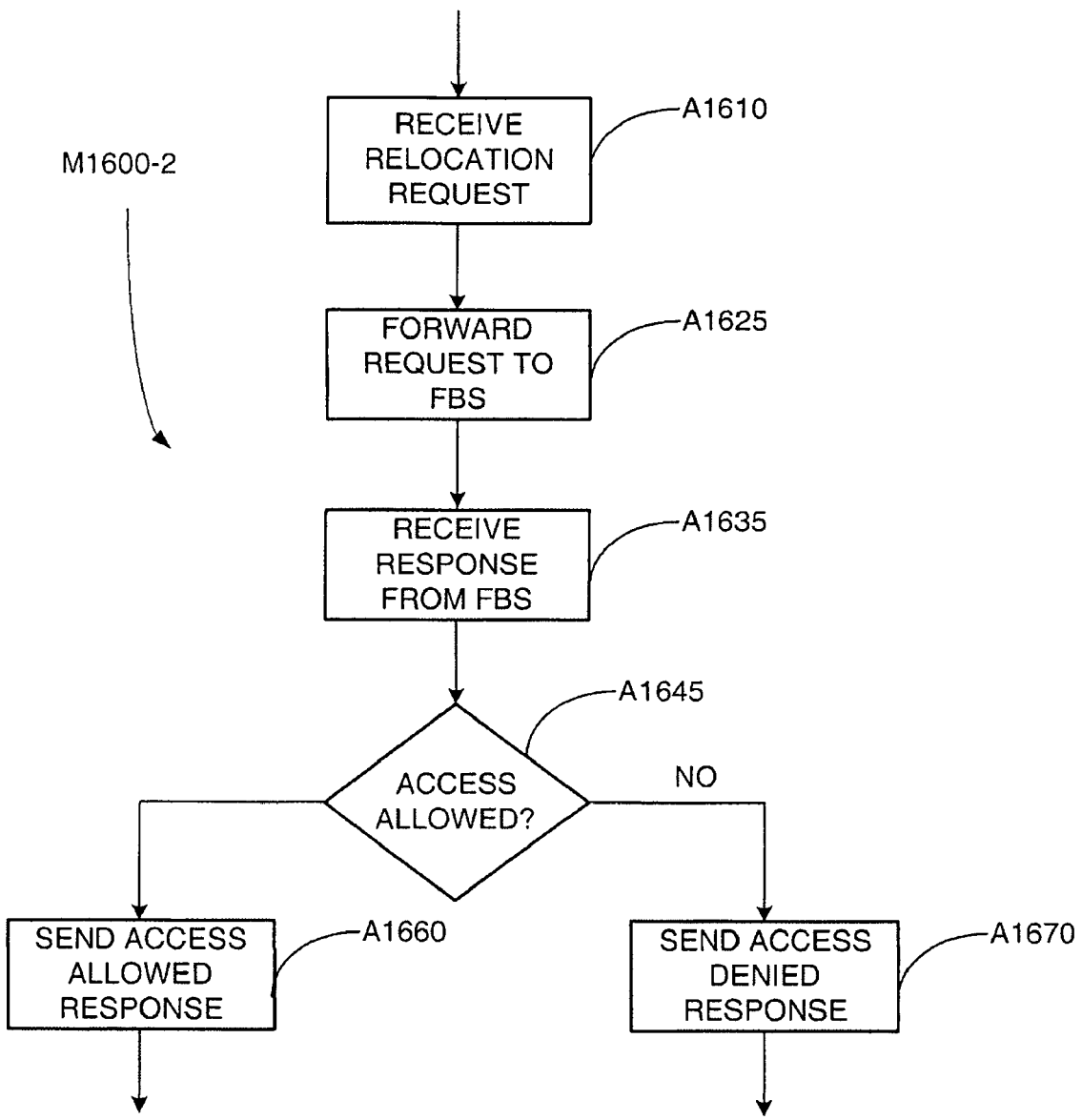

FIG. 16-1 is a flow chart of an example method M1600-1 to perform access control for the UE 130 from the perspective of the mobility controller 140, 150. In the method, the mobility controller 140, 150 makes the access control decision. In A1610, a request for relocation is received. The request may be received from either the source mobility controller 140 (sequence (4) in FIGS. 2-1 and 3-1) or from the source MBS 110 (sequence (3) in FIGS. 2-2 and 3-2). In A1620, the mobility controller 140, 150 determines whether access should be allowed, for example, by consulting an access control list maintained within the mobility controller 140, 150 or in an accessible data base.

If the access is allowed in A1630 (sequence (5) in FIGS. 2-1 and 2-2), then the mobility controller 140, 150 notifies the target FBS 120 in A1640, receives an acknowledgement from the target FBS 120 in A1650, and sends an access allowed response to the source mobility controller 140 or to the source MBS 110 in A1660. Sequences (6), (7), (8) and (9) in FIGS. 2-1 and 2-2. If the access is not allowed, then the mobility controller 140, 150 sends an access denied response in A1670. Sequences (8') and (9') in FIGS. 3-1 and 3-2.

FIG. 16-2 is a flow chart of another example method M1600-2 to perform access control for the UE 130 from the perspective of the mobility controller 140, 150. In this method, the mobility controller 140, 150 forwards the access request so that the target FBS 120 can make the access control decision. In A1610, a request for relocation is received just as in FIG. 16-1. (sequence (4) in FIGS. 2-3 and 2-4) or (sequence (3) in FIGS. 3-3 and 3-4). In A1625, the request is forwarded to the target FBS 120 (sequence (6) in FIGS. 2-3, 2-4, 3-3 and 3-4). In A1635, a response is received from the FBS 120.

If the response indicates that access is allowed in A1645 (sequence (7) in FIGS. 2-3 and 2-4), then the mobility controller 140, 150 forwards the access allowed response to the source mobility controller 140 or to the source MBS 110 (sequences (8) and (9) in FIGS. 2-3 and 2-4). If access is not allowed (sequence (7') in FIGS. 3-3 and 3-4), then the access denied response is forwarded (sequences (8') and (9') in FIGS. 3-3 and 3-4) in A1670.

Figure 17:
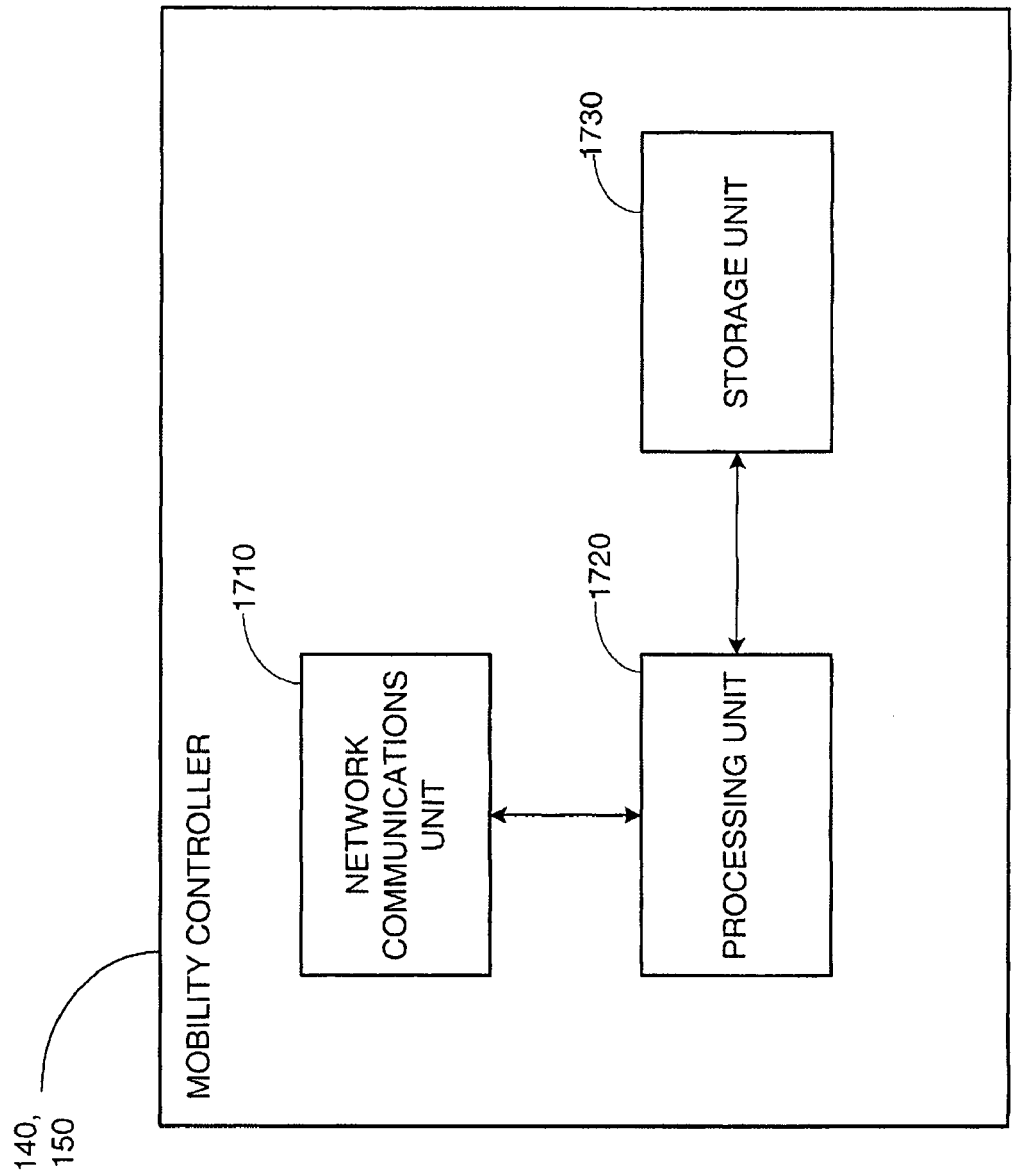
FIG. 17 illustrates an embodiment of the mobility controller.

FIG. 17 illustrates an embodiment of a mobility controller such as the mobility controller 140, 150. The mobility controller 140, 150 includes, among other elements, a network communications unit 1710 arranged to communicate with network elements such as other mobility controllers, the target FBS 120 and the source MBS 110. The mobility controller 140, 150 can include a storage unit 1730 arranged to store the access control list. Further, the mobility controller 140, 150 includes a processing unit 1720 arranged to control the network communications unit 1710 and the storage unit 1730, and to generally perform the methods described above.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public. Yet further, in the method claims, the acts of the method are provided with parenthetical notations (a), (b), (c) and so on. These are provided merely for ease of reference and are not meant to convey that the acts are to be performed in any specific order.

What is claimed is:

1. A method to perform a relocation of a user equipment (UE) from a source macro base station (MBS) to a target femto base station (FBS), comprising:
   detecting the target FBS based on a white list of the UE;
   reporting the target FBS to the source MBS;
   receiving a command from the source MBS;
   relocating so that the UE is handed over from the source MBS to the target FBS when the command from the source MBS is to relocate the UE; and
   updating the white list of the UE to modify information regarding the target FBS to indicate that the UE is not allowed to access the target FBS when the command from the source MBS is to update the white list,
   wherein the white list includes information on one or more femto base stations available to provide connectivity to the UE including a short identity and a long identity for each of the one or more femto base stations,
   wherein the long identity uniquely identifies each femto base station and the short identity non-uniquely identifies each femto base station, and
   wherein in the act of detecting the target FBS, the target FBS is detected based on the short and the long identities of the target FBS.

2. The method of claim 1, wherein the acts of detecting and reporting the target FBS comprise:
   determining whether there are possible femto base stations for the relocation of the UE based on the white list;
   identifying a femto base station as the target FBS when it is determined that there are possible femto base stations for the relocation;
   determining whether the relocation to the target FBS is allowable after identifying the target FBS; and
   reporting the long identity of the target FBS to the source MBS when it is determined that the relocation to the target FBS is allowable.

3. The method of claim 2, wherein the act of determining whether there are possible femto base stations for the relocation of the UE is based on one or more of:
   a presence of a base station with a short identity that is listed in the white list as being a femto base station,
   the source MBS being listed in the white list as having a macro cell that over lays one or more femto base cell areas corresponding to one or more femto base stations,
   a timing advance of the source MBS matching one or more timing advances in the white list,
   a location of the UE being within a predetermined distance of one or more femto base stations in the white list, and
   a current time matching within a predetermined tolerance of one or more normal access times listed for one or more femto base stations in the white list.

4. The method of claim 2, wherein the acts of identifying the target FBS and determining whether the relocation to the target FBS is allowable comprise:
   retrieving the short identity of a detected femto base station;
   determining whether the relocation to the detected femto base station is possible based on the short identity;
   retrieving the long identity of the detected femto base station when it is determined that the relocation to the detected femto base station is possible based on the short identity;
   determining whether the relocation to the detected femto base station is possible based on the long identity; and
   reporting the long identity of the detected femto base station as the target FBS to the source MBS when it is determined that the relocation to the detected femto base station is possible based on the long identity.

5. The method of claim 4, wherein the acts of retrieving the short identity of the detected femto base station and determining whether the relocation to the detected femto base station based on the short identity is possible comprise:
   requesting the source MBS for a short gap;
   receiving a grant of the short gap from the source MBS;
   reading the short identity of the detected femto base station during the short gap after receiving the grant of the short gap; and
   determining whether the read short identity is in the white list and determining that the relocation is possible when the short identity is in the white list and not possible otherwise,
   wherein the short gap is a time slot in which the source MBS will not transmit data to the UE to allow the UE to read the short identity transmitted by the detected femto base station.

6. The method of claim 5, wherein the acts of retrieving the long identity of the detected femto base station and determining whether the relocation to the detected femto base station based on the short identity is possible comprise:
   requesting the source MBS for a long gap;
   receiving a grant of the long gap from the source MBS;
   reading the long identity of the femto base station during the long gap after receiving grant of the long gap; and
   determining whether the read long identity is in the white list and determining that the relocation is possible when the long identity is in the white list and not possible otherwise,
   wherein the long gap is a time slot in which the source MBS will not transmit data to the UE to allow the UE to read the long identity transmitted by the femto base station, and
   wherein a duration of the long gap is longer than a duration of the short gap.

7. The method of claim 2, wherein the acts of identifying the target FBS and determining whether the relocation to the target FBS is allowable comprise:
   determining whether the target FBS and the source MBS are on a same carrier;
   requesting the source MBS for a long gap when it is determined that the target FBS and the source MBS are on the same carrier;
   receiving a grant of the long gap from the source MBS;
   reading the long identity of the target FBS during the long gap after receiving the grant of the long gap; and
   determining whether the read long identity is in the white list and determining that the relocation is possible when the long identity is in the white list and not possible otherwise,
   wherein the long gap is a time slot in which the source MBS will not transmit data to the UE to allow the UE to read the long identity transmitted by the target FBS.

8. The method of claim 2,
   wherein the UE is a dual receiver UE, and
   wherein the acts of identifying the target FBS and determining whether the relocation to the target FBS is allowable comprise:
   reading the long identity transmitted by the target FBS; and
   determining whether the read long identity is in the white list and determining that the relocation is possible when the long identity is in the white list and not possible otherwise.

9. A user equipment (UE), comprising:
a radio communications unit arranged to communicate with a source macro base station (MBS) and a target femto base station (FBS) in a network;
a storage unit arranged to store a white list; and
a processing unit arranged to trigger a relocation of the UE from the source MBS to the target FBS,
wherein the processing unit is arranged to:
   detect the target FBS based on the white list,
   report the target FBS to the source MBS,
   receive a command from the source MBS,
   relocate so that the UE is handed over from the source MBS to the target FBS when the command from the source MBS is to relocate the UE, and
   update the white list in the storage unit to modify information regarding the target FBS to indicate that the UE is not allowed to access the target FBS when the command from the source MBS is to update the white list,
wherein the white list in the storage unit includes information on one or more femto base stations available to provide connectivity to the UE including a short identity and a long identity for each of the one or more femto base stations,
wherein the long identity uniquely identifies each femto base station and the short identity non-uniquely identifies each femto base station, and
wherein the processing unit is arranged to detect the target FBS based on the short and the long identities of the target FBS.

10. The UE of claim 9, wherein the processing unit is arranged to detect and report the target FBS by:
   determining whether there are possible femto base stations for the relocation of the UE based on the white list,
   identifying a femto base station as the target FBS when it is determined that there are possible femto base stations for the relocation,
   determining whether the relocation to the target FBS is allowable after the target FBS is identified, and
   reporting the target FBS to the source MBS when it is determined that the relocation to the target FBS is allowable.

11. The UE of claim 10, wherein the processing unit is arranged to determine whether there are possible femto base stations for the relocation of the UE based on at least one of the following conditions being true:
   a presence of a base station with a short identity that is listed in the white list as being a femto base station, wherein the short identity non-uniquely identifies a femto base station,
   the source MBS is listed in the white list as having a macro cell that over lays one or more femto cell areas,
   a timing advance of the source MBS matches one or more timing advances in the white list,
   a location of the UE is within a predetermined distance of one or more femto base stations in the white list, and
   a current time matches within a predetermined tolerance of one or more normal access times listed for one or more femto base stations in the white list.

12. The UE of claim 10, wherein the processing unit is arranged to identify the target FBS and to determine whether the relocation to the target FBS is allowable by:
   retrieving the short identity of a detected femto base station,
   determining whether the relocation to the detected femto base station is possible based on the short identity,
   retrieving the long identity of the detected femto base station when it is determined that the relocation to the detected femto base station is possible based on the short identity,
   determining whether the relocation to the detected femto base station is possible based on the long identity, and
   reporting the long identity of the detected femto base station as the target FBS to the source MBS when it is determined that the relocation to the detected femto base station is possible based on the long identity.

13. The UE of claim 12, wherein the processing unit is arranged to retrieve the short identity of the detected femto base station and to determine whether the relocation to the detected femto base station based on the short identity is possible by:
   requesting the source MBS for a short gap,
   receiving a grant of the short gap from the source MBS,
   reading the short identity of the detected femto base station during the short gap after receiving the grant of the short gap, and
   determining whether the read short identity is in the white list and determining that the relocation is possible when the short identity is in the white list and not possible otherwise,
   wherein the short gap is a time slot in which the source MBS will not transmit data to the UE to allow the UE to read the short identity transmitted by the detected femto base station.

14. The UE of claim 13, wherein the processing unit is arranged retrieve the long identity of the detected femto base station and to determine whether the relocation to the detected femto base station based on the short identity is possible by:
   requesting the source MBS for a long gap;
   receiving a grant of the long gap from the source MBS;
   reading the long identity of the detected femto base station during the long gap after receiving grant of the long gap; and
   determining whether the read long identity is in the white list and determining that the relocation is possible when the long identity is in the white list and not possible otherwise,
   wherein the long gap is a time slot in which the source MBS will not transmit data to the UE to allow the UE to read the long identity transmitted by the femto base station, and
   wherein a duration of the long gap is longer than a duration of the short gap.

15. The UE of claim 10, wherein the processing unit is arranged to identify the target FBS and to determine whether the relocation to the target FBS is allowable by:
   determining whether the target FBS and the source MBS are on a same carrier,
   requesting the source MBS for a long gap when it is determined that the target FBS and the source MBS are on the same carrier,
   receiving a grant of the long gap from the source MBS,
   reading the long identity of the target FBS during the long gap after receiving the grant of the long gap, and
   determining whether the read long identity is in the white list and determining that the relocation is possible when the long identity is in the white list and not possible otherwise,
   wherein the long gap is a time slot in which the source MBS will not transmit data to the UE to allow the UE to read the long identity transmitted by the target FBS.

16. The UE of claim 10,
wherein the radio communications unit is arranged to perform as a dual-receiver, and
wherein the processing unit is arranged to identify the target FBS and to determine whether the relocation to the target FBS is allowable by:
reading the long identity transmitted by the target FBS; and
determining whether the read long identity is in the white list and determining that the relocation is possible when the long identity is in the white list and not possible otherwise.

17. A method to perform a relocation of a user equipment (UE) from a source macro base station (MBS) to a target femto base station (FBS), comprising:
receiving a request for a short gap from the UE;
granting the short gap to the UE;
receiving a request for a long gap from the UE; and
granting the long gap to the UE;
wherein the short gap is a time slot in which the source MBS will not transmit data to the UE to allow the UE to read a short identity transmitted by the target FBS,
wherein the long gap is a time slot in which the source MBS will not transmit data to the UE to allow the UE to read a long identity transmitted by the target FBS, and
wherein the long identity uniquely identifies the target FBS and the short identity non-uniquely identifies the target FBS,
wherein a duration of the long gap is longer than a duration of the short gap.

18. The method of claim 17, further comprising:
receiving a long identity of the target FBS from the UE;
making a relocation request to a mobility controller of a network to relocate the UE to the target FBS;
receiving a response from the mobility controller;
sending a relocation command to the UE when the response from the mobility controller indicates that the relocation of the UE is allowed; and
sending a white list update command to the UE when the response from the mobility controller indicates that the relocation of the UE is not allowed,
wherein the white list is maintained by the UE and includes information on one or more femto base stations available to provide connectivity to the UE including a short identity and a long identity for each of the one or more femto base stations, and
wherein the long identity uniquely identifies each femto base station and the short identity non-uniquely identifies each femto base station.

19. The method of claim 18, wherein the source MBS is not preconfigured to have knowledge of the target FBS.

20. A macro base station (MBS), comprising:
a radio communications unit arranged to communicate with a user equipment (UE); and
a processing unit arranged to via the radio communications unit:
receive a request for a short gap from the UE;
grant the short gap to the UE;
receive a request for a long gap from the UE; and
grant the long gap to the UE;
wherein the short gap is a time slot in which the MBS will not transmit data to the UE to allow the UE to read a short identity transmitted by a target femto base station (FBS),
wherein the long gap is a time slot in which the MBS will not transmit data to the UE to allow the UE to read a long identity transmitted by the target FBS,
wherein the long identity uniquely identifies the target FBS and the short identity non-uniquely identifies the target FBS, and
wherein a duration of the long gap is longer than a duration of the short gap.

21. The MBS of claim 20, further comprising:
a network communications unit arranged to communicate with a mobility controller,
wherein the processing unit is further arranged to:
receive a long identity of the target FBS from the UE via the radio communications unit;
make a relocation request to relocate the UE to the target FBS to the mobility controller of a network via the network communications unit;
receive a response from the mobility controller via the network communications unit;
send a relocation command to the UE via the radio communications unit when the response from the mobility controller indicates that the relocation of the UE is allowed; and
send a white list update command to the UE via the radio communications unit when the response from the mobility controller indicates that the relocation of the UE is not allowed,
wherein the white list is maintained by the UE and includes information on one or more femto base stations available to provide connectivity to the UE including a short identity and a long identity for each of the one or more femto base stations, and
wherein the long identity uniquely identifies each femto base station and the short identity non-uniquely identifies each femto base station.

22. The MBS of claim 21, wherein the MBS is not preconfigured to have knowledge of the target FBS.

23. A method to perform a relocation of a user equipment (UE) from a source macro base station (MBS) to a target femto base station (FBS), comprising:
broadcasting a short identity and a long identity of the target FBS;
receiving from a mobility controller a request for relocation of the UE from the source MBS to the target FBS;
determining whether access to the target FBS is allowed based on an identity of the UE;
sending a relocation response to the mobility controller indicating access allowance when it is determined that the UE is allowed to access the target FBS; and
sending the relocation response to the mobility controller indicating access denial when it is determined that the UE is not allowed to access the target FBS, and
wherein the long identity uniquely identifies the target FBS and the short identity non-uniquely identifies the target FBS.

24. The method of claim 23, wherein act of determining whether access to the target FBS is allowed comprises:
comparing the identity of the UE with an access control list, the access control list including identity(ies) of one or more user equipments that is(are) allowed to access the target FBS;
determining that access is allowed when the UE identity is included in the access control list; and
determining that access is not allowed when the UE identity is not included in the access control list.

25. A femto base station (FBS), comprising:
a radio communications unit arranged to communicate with a user equipment (UE);
a network communications unit arranged to communicate with a mobility controller of a network; and a processing unit arranged to:
  broadcast a short identity and a long identity of the FBS via the radio communications unit;
  receive from a mobility controller via the network communications unit a request for relocation of the UE from a source macro base station (MBS);
  determine whether access to the FBS is allowed based on an identity of the UE;
  send a relocation response to the mobility controller via the network communications unit indicating access allowance when it is determined that the UE is allowed to access the target FBS; and
  send the relocation response to the mobility controller via the network communications unit indicating access denial when it is determined that the UE is not allowed to access the target FBS,
wherein the long identity uniquely identifies the FBS and the short identity non-uniquely identifies the FBS.

26. The FBS of claim 25, further comprising:
a storage unit arranged to store an access control list, the access control list including identity(ies) of one or more user equipments that is(are) allowed to access the FBS,
wherein the processing unit is arranged to determine whether the access to the FBS is allowed by:
comparing the identity of the UE with the access control list,
determining that access is allowed when the UE identity is included in the access control list; and
determining that access is not allowed when the UE identity is not included in the access control list.

27. The method of claim 2, wherein the act of determining whether there are possible femto base stations for the relocation of the UE is triggered in response to a manual operation by a user and/or automatically on a periodic basis.

28. The method of claim 2, wherein a short range wireless protocol signal is utilized in the act of determining whether there are possible femto base stations for the relocation of the UE.

29. The method of claim 8, wherein the long identity transmitted by the target FBS is transmitted on a 3GPP radio signal different from a 3GPP radio signal transmitted by the source MBS or is transmitted on a short range wireless protocol signal.

30. The UE of claim 10, wherein the processing unit is arranged to determine whether there are possible femto base stations for relocation in response to a manual triggering operation by a user and/or automatically on a periodic basis.

31. The UE of claim 10, wherein the processing unit is arranged to utilize a short range wireless protocol signal to determine whether there are possible femto base stations for relocation.

32. The UE of claim 16, wherein the radio communications unit is arranged to read the long identity transmitted by the target FBS on a 3GPP radio signal different from a 3GPP radio signal transmitted by the source MBS or transmitted on a short range wireless protocol signal.

33. The method of claim 23, wherein in the act of broadcasting the short identity and the long identity of the target FBS, one or both of the short and long identities are broadcasted on a 3GPP radio signal different from a 3GPP radio signal transmitted by the source MBS or on a short range wireless protocol signal.

34. The FBS of claim 25, wherein in the processing unit is arranged to broadcast the short identity and/or the long identity on a 3GPP radio signal different from a 3GPP radio signal transmitted by the source MBS or on a short range wireless protocol signal.

35. A method to perform a relocation of a user equipment (UE) from a source macro base station (MBS) to a target femto base station (FBS), comprising:
  receiving a request for relocation from a source mobility controller or from the source MBS;
  determining whether access is allowed locally within a mobility controller or allowing the target FBS to determine whether the access is allowed;
  sending an access allowed response to the source mobility controller or to the source MBS when it is determined that the access is allowed; and
  sending an access denied response to the source mobility controller or to the source MBS when it is determined that the access is not allowed,
wherein when the access is determined locally within the mobility controller, the method further comprises:
  notifying the target FBS of the relocation request and a grant of the request; and
  receiving an acknowledgment from the target FBS, and
wherein when the target FBS is allowed to determine access, the method further comprises:
  forwarding the relocation request to the target FBS; and
  receiving one of the access allowed response or the access denied response from the target FBS.

36. A mobility controller, comprising:
a network communications unit arranged to communicate with another mobility controller, a source macro base station (MBS), and a target femto base station (FBS); and
a processing unit arranged to:
  receive a request for relocation from the another mobility controller or from the source MBS,
  locally determine whether access is allowed or allow the target FBS to determine whether the access is allowed,
  send an access allowed response to the another mobility controller or to the source MBS when it is determined that the access is allowed, and
  send an access denied response to the another mobility controller or to the source MBS when it is determined that the access is not allowed,
wherein when the processor unit locally determines the access, the processor unit is arranged to:
  notify the target FBS of the relocation request and a grant of the request, and
  receive an acknowledgment from the target FBS, and
wherein when the target FBS is allowed to determine access, the processor unit is arranged to:
  forward the relocation request to the target FBS; and
  receive one of the access allowed response or the access denied response from the target FBS.

37. The mobility controller of claim 36, further comprising:
a storage unit arranged to store an access control list, the access control list including identity(ies) of one or more user equipments that is(are) allowed to access the target FBS,
wherein the processing unit is arranged to determine whether the access to the target FBS is allowed by:
  comparing the identity of the UE with the access control list,
  determining that access is allowed when the UE identity is included in the access control list; and
  determining that access is not allowed when the UE identity is not included in the access control list.

38. The method of claim 8,
wherein the act of reading the long identity transmitted by the target FBS is performed without requesting the source MBS for a short gap and without requesting a long gap,
wherein the short gap is a time slot in which the source MBS will not transmit data to the UE to allow the UE to read the short identity transmitted by the target FBS, and
wherein the long gap is a time slot in which the source MBS will not transmit data to the UE to allow the UE to read the long identity transmitted by the target FBS.

39. The UE of claim 16,
wherein the processing unit reads the long identity transmitted by the target FBS without requesting the source MBS for a short gap and without requesting a long gap,
wherein the short gap is a time slot in which the source MBS will not transmit data to the UE to allow the UE to read the short identity transmitted by the target FBS, and
wherein the long gap is a time slot in which the source MBS will not transmit data to the UE to allow the UE to read the long identity transmitted by the target FBS.

* * * * *